(12) United States Patent
Meng et al.

(10) Patent No.: US 11,175,467 B2
(45) Date of Patent: Nov. 16, 2021

(54) FLUID DETECTION PANEL

(71) Applicant: BOE TECHNOLOGY GROUP CO., LTD., Beijing (CN)

(72) Inventors: Xianqin Meng, Beijing (CN); Xiandong Meng, Beijing (CN); Wei Wang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 270 days.

(21) Appl. No.: 16/515,552

(22) Filed: Jul. 18, 2019

(65) Prior Publication Data

US 2020/0233158 A1 Jul. 23, 2020

(51) Int. Cl.
*G01J 3/28* (2006.01)
*G02B 6/42* (2006.01)
*G01N 21/85* (2006.01)
*G01N 21/27* (2006.01)

(52) U.S. Cl.
CPC .......... *G02B 6/4204* (2013.01); *G01N 21/274* (2013.01); *G01N 21/85* (2013.01); *G01N 2201/08* (2013.01)

(58) Field of Classification Search
CPC .... G01J 3/02; G01J 3/28; G01J 3/2803; G01J 3/10; G01J 3/2823
USPC ........................................................ 356/326
See application file for complete search history.

(56) References Cited

U.S. PATENT DOCUMENTS

| | | | |
|---|---|---|---|
| 5,652,653 A | 7/1997 | Alsmeyer et al. | |
| 6,986,837 B2 | 1/2006 | Chow et al. | |
| 8,642,319 B2 | 2/2014 | Kasai et al. | |
| 9,013,704 B2 * | 4/2015 | Garcia Da Fonseca | G01N 21/253 356/445 |
| 9,417,186 B2 | 8/2016 | Jakoby et al. | |
| 9,714,443 B2 | 7/2017 | Maerki et al. | |
| 2006/0045809 A1 | 3/2006 | Shirai et al. | |
| 2012/0214707 A1 | 8/2012 | Ymeti et al. | |

(Continued)

FOREIGN PATENT DOCUMENTS

| | | |
|---|---|---|
| CN | 1149336 U | 5/1997 |
| CN | 1323393 A | 11/2001 |

(Continued)

OTHER PUBLICATIONS

Chinese Search Report from Chinese Patent Application No. 201910044674.4 dated Dec. 17, 2020.

(Continued)

*Primary Examiner* — Md M Rahman
(74) *Attorney, Agent, or Firm* — Dilworth & Barrese, LLP.; Michael J. Musella, Esq.

(57) ABSTRACT

A fluid detection panel is disclosed. The fluid detection panel includes a microfluidic substrate, an optical unit and a sensor. The microfluidic substrate includes a sample detection area and a comparison detection area which are arranged in parallel, and the sample detection area is configured to allow a liquid sample to arrive at the sample detection area; the optical unit is configured to provide first light and to allow the first light to be incident on both of the sample detection area and the comparison detection area; and the sensor collects the first light which passes through the sample detection area and the first light which passes through the comparison detection area.

20 Claims, 14 Drawing Sheets

(56) References Cited

U.S. PATENT DOCUMENTS

| | | |
|---|---|---|
| 2013/0120750 A1 | 5/2013 | Zheng et al. |
| 2013/0203613 A1 | 8/2013 | Burmeister et al. |
| 2013/0309779 A1 | 11/2013 | Kasai et al. |
| 2014/0198313 A1* | 7/2014 | Tracy .................. G01J 3/06 356/300 |
| 2015/0177125 A1 | 6/2015 | Kasai |
| 2016/0067822 A1 | 3/2016 | Arai et al. |
| 2019/0369007 A1 | 12/2019 | Tan et al. |

FOREIGN PATENT DOCUMENTS

| | | |
|---|---|---|
| CN | 1546990 A | 11/2004 |
| CN | 1727892 A | 2/2006 |
| CN | 1867795 A | 11/2006 |
| CN | 101451995 A | 6/2009 |
| CN | 102230986 A | 11/2011 |
| CN | 102460127 A | 5/2012 |
| CN | 102713578 A | 10/2012 |
| CN | 103323395 A | 9/2013 |
| CN | 103424554 A | 12/2013 |
| CN | 104290319 A | 1/2015 |
| CN | 104535541 A | 4/2015 |
| CN | 104729993 A | 6/2015 |
| CN | 104854443 A | 8/2015 |
| CN | 104977274 A | 10/2015 |
| CN | 105699294 A | 6/2016 |
| CN | 106770043 A | 5/2017 |
| CN | 107255710 A | 10/2017 |
| CN | 108993620 A | 12/2018 |
| EP | 2 506 014 A3 | 12/2012 |
| JP | 2008096454 A | 4/2008 |

OTHER PUBLICATIONS

First Chinese Office Action from Chinese Patent Application No. 201910044674.4 dated Dec. 17, 2020.
Second Chinese Office Action in Chinese Patent Application No. 201910044674.4 dated Jun. 10, 2021.

* cited by examiner

Wavelength (micrometer)

FLUID DETECTION PANEL

CROSS REFERENCE TO RELATED APPLICATIONS

The present application claims priority to Chinese patent application No. 201910044674.4, filed on Jan. 17, 2019, the entire disclosure of which is incorporated herein by reference as part of the present application.

TECHNICAL FIELD

Embodiments of the present disclosure relate to a fluid detection panel.

BACKGROUND

A spectrometer can extract desired monochromatic light from light (for example, white light) with a complicated composition and then the monochromatic light can be used to measure a sample. As a technology for accurately controlling and manipulating microscale fluid, microfluidics technology can integrate basic operation units, such as units of sample preparation, reaction, separation and detection, for biochemical analysis processes into a micrometer-scale chip, so as to automatically realize an analysis process. The microfluidic technology has the advantages of low sample consumption, fast detection speed, simple and convenient operation, multi-functional integration, small size, portability, etc., and has a great application potential in fields of biology, chemistry, medicine, or the like.

SUMMARY

At least one embodiment provides a fluid detection panel, which comprises: a microfluidic substrate, an optical unit and a sensor. The microfluidic substrate comprises a sample detection area and a comparison detection area which are arranged in parallel, and the sample detection area is configured to allow a liquid sample to arrive at the sample detection area; the optical unit is configured to provide first light and to allow the first light to be incident on both of the sample detection area and the comparison detection area; and the sensor collects the first light which passes through the sample detection area and the first light which passes through the comparison detection area.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
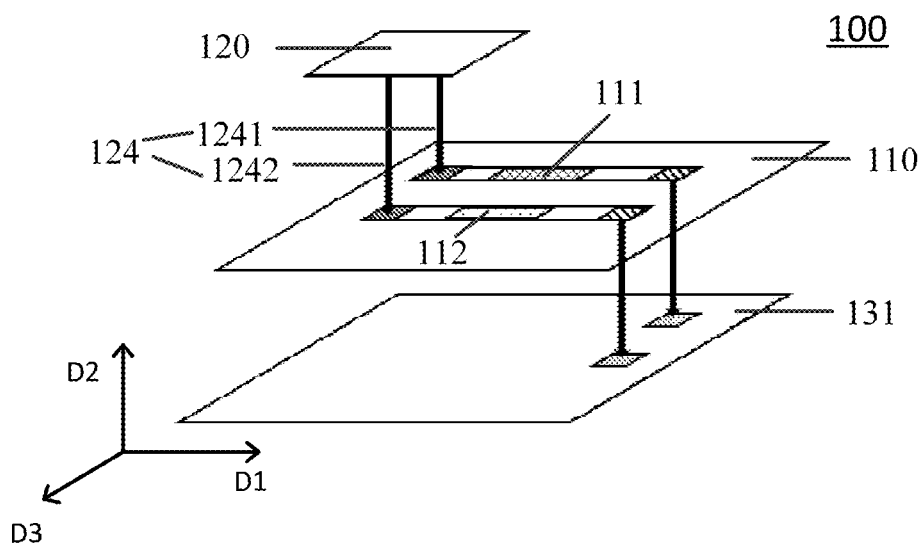
FIG. 1 is a schematic diagram of a fluid detection panel provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventors of the present disclosure have noticed during research that current spectrometer includes free-space optical elements (such as a prism, a lens, a grating, etc.), which causes current spectrometer to be usually large in size and expensive, and cause the sample to be detected to be usually measured in a laboratory, thereby limiting the application field of the spectrometer. In addition, the inventors of the present disclosure have further noticed during research that current spectrometer is difficult to be used in combination with the microfluidic substrate (for example, a microfluidic passage), and thus it is difficult to utilize the advantages of moving, separating, aggregating trace of fluid drops by the microfluidic substrate when using current spectrometer.

In addition, the inventors of the present disclosure have noticed that two detections are performed during two different time periods to reduce the influence of changes in various elements of the spectrometer (for example, changes in a spectrum or intensity of the output light of the light source) and changes in the light propagation path on detection results. In the first detection, the light output from a light source do not pass through the sample to be detected, and in the second detection, the light output from the light source pass through the sample to be detected. However, the inventors of the present disclosure have noticed that the stability of the light source in current spectrometer (for example, the fluctuation range of the light intensity of the light output from the light source) and the stability of the light propagation path (for example, the fluctuation of the temperature) have a relatively great influence on the detection result. In order to obtain good effects, a light source with better stability is required, and the spectrometer is required to be warmed up during a long time before performing sample detection. For example, the warm up process lasts for 30 to 60 minutes to stabilize the output of the light source and the characteristic of the light propagation path, which not only increases the cost of the spectrometer (using an expensive light source with a good stability), reduces a detection efficiency of the spectrometer, but also causes the conventional spectrometer to be able to obtain accurate detection results only in stable environments (for example, laboratories).

Some embodiment provide a fluid detection panel, which comprises: a microfluidic substrate, an optical unit and a sensor. The microfluidic substrate comprises a sample detection area and a comparison detection area which are arranged in parallel, and the sample detection area is configured to allow a liquid sample to arrive at the sample detection area; the optical unit is configured to provide first light and to allow the first light to be incident on (for example, simultaneous incident on) both of the sample detection area and the comparison detection area; and the sensor collects the first light which passes through the sample detection area and the first light which passes through the comparison detection area.

In some examples of the fluid detection panel provided by the embodiments of the present disclosure, by providing a comparison detection area, the influence of fluctuation (spectral fluctuations and/or fluctuations of light intensity) of the light emitted by the light source and the influence of environmental changes on the characteristics of the light propagation path can be eliminated or reduced without performing, for example, multiple measurements (for example, without performing a comparison detection before the sample is detected). Therefore, the influence of stability of the light source and environmental changes on the detection results of the fluid detection panel can be reduced, thereby improving the accuracy of the detection result outputted by the fluid detection panel, reducing the demands from the fluid detection panel for the stability of the light source and the environmental stability, and improving the robustness of the fluid detection panel and the range of applications of the fluid detection panel (for example, applied in on-site detection outside the laboratory).

In some examples of the fluid detection panel provided by the embodiments of the present disclosure, the optical unit includes a light source and a filter structure, and the filter structure is configured to obtain the first light through filtering the second light emitted by the light source, and configured to allow the first light to be simultaneously incident on a sample detection area and a comparison detection area. Because the full width at half maximum of the first light is less than that of the second light (that is, the monochromaticity of the first light is better than that of the second light), the arrangement of the filter structure in the optical unit can reduce the full width at half maximum (FWHM) of the first light for sample detection and thus improve the detection accuracy of the fluid detection panel.

In some other examples of the fluid detection panel provided by the embodiments of the present disclosure, the optical unit may not include a light source (for example, the optical unit only includes a filter structure), in which case users can configure the light source by themselves. In still other examples of the fluid detection panel provided by the embodiments of the present disclosure, the optical unit may not include a filter structure (for example, the optical unit only includes a light source), in which case the full width at half maximum of the light output by the light source is relatively small.

It should be noted that, in some examples, "the optical unit being configured to provide the first light" is not limited to the case where the optical unit generates and emits light by itself (i.e., the optical unit may not include a light source or other active elements), in this case, the optical unit is configured to obtain and provide the first light through performing a corresponding processing (for example, a filtering processing) on the light (light emitted by the light emitting element which is provided at the outside of the light source unit) that is incident on the optical unit.

In some examples of the fluid detection panel provided by the embodiments of the present disclosure, the microfluidic substrate further includes a flow passage provided in the optical waveguide structure, such that the reaction between the first light and the liquid sample can be more sufficient. For example, the distance and time of the reaction between the first light and the liquid sample can be increased by increasing a size of a propagation passage of the first optical waveguide structure in a third direction (for example, in the case of the flow velocity of the liquid sample is kept being a constant value). In this case, the detection sensitivity of the fluid detection panel and the range of application of the fluid detection panel can be improved without increasing a thickness (a thickness in the second direction) of the flow passage and a dosage of the liquid sample. For example, the fluid detection panel can be used for detecting a liquid sample with a lower concentration and/or a trace amount of liquid sample.

In some examples of the fluid detection panel provided by the embodiments of the present disclosure, the sensor includes a comparison photosensitive area; the light passing through the sample detection area and the light passing through the comparison detection area may be superimposed in the comparison photosensitive area; and the comparison photosensitive area is configured to detect the intensity distribution of the superimposed light, and thus the information of the liquid sample can be obtained based on the intensity distribution provided by the sensor. In this case, for example, the information of the liquid sample (for example, whether or not the liquid sample to be detected contains predetermined molecules or bacteria) can be obtained without comparing the signal output from the sensor with the data of a pre-stored standard sample, thereby improving the detection efficiency and costs of the fluid detection panel.

In some examples of the fluid detection panel provided by the embodiments of the present disclosure, the microfluidic substrate is integrated in the spectrometer, thereby facilitating (in favor of) the detection of the liquid sample (for example, a trace amount of liquid).

For example, the fluid detection panel provided by some embodiments of the present disclosure may be used in the physical, biological, and chemical fields such as spectroscopic detection, substantial analysis, calibration, molecular diagnostics, food quarantine, and bacteria classification, or the like. For example, this fluid detection panel can be applied in the fields of physics, chemistry, biology, medicine, agronomy, or the like for substantial analysis or molecular analysis.

In some examples, the fluid detection panel can also be referred to as a fluid detection device. It should be noted that the fluid detection panel is configured to detect information of a fluid, and is not configured to display an image.

Non-limitative descriptions are given to the fluid detection panel provided by at least one embodiment of the present disclosure in the following with reference to a plurality of examples. As described in the following, in case of no conflict, different features in these specific examples may be combined so as to obtain new examples, and the new examples are also fall within the scope of present disclosure.

FIG. 1 illustrates a schematic diagram of a fluid detection panel 100 provided by some embodiments of the present disclosure. As illustrated in FIG. 1, the fluid detection panel 100 includes a microfluidic substrate 110, an optical unit 120 and a sensor 131. The microfluidic substrate 110 includes a sample detection area 111 and a comparison detection area 112 which are arranged in parallel, and the sample detection area 111 is configured to allow a liquid sample to arrive at the sample detection area 11. For example, the optical unit 120, the microfluidic substrate 110 and the sensor 131 are provided sequentially in a second direction D2, and the sample detection area 111 and the comparison detection area 112 are arranged in parallel in a third direction D3. For example, the sample detection area 111 and the comparison detection area 112 are directly adjacent to each other, for example, no other detection area is between the sample detection area 111 and the comparison detection area 112. The second direction D2 is intersected with (for example, is perpendicular to) the third direction D3.

In operation, the first light 124 outputted by the optical unit 120 is incident on the sample detection area 111 and the comparison detection area 112, and the sensor 131 collects the first light 124 passing through the sample detection area 111 and the first light 124 passing through the comparison detection area 112. Because the first light sensor 131 collects the first light 124 which passes through the sample detection area 111 and carries the information of the liquid sample and collects the first light 124 which passes through the comparison detection area 112, the influence of fluctuation (spectral fluctuations and/or fluctuations of light intensity) of the first light 124 outputted by the optical unit 120 and the influence of environmental changes on the characteristics of the light propagation path can be subtracted from (eliminated from) the detection result obtained by the fluid detection panel 100, thereby improving the accuracy of the detection result outputted by the fluid detection panel, lowering the demands of the fluid detection panel on the stability of the light source and the environmental stability, and improving the robustness of the fluid detection panel and widen range of applications (for example, applied in on-site detection outside the laboratory) of the fluid detection panel.

Figure 2:
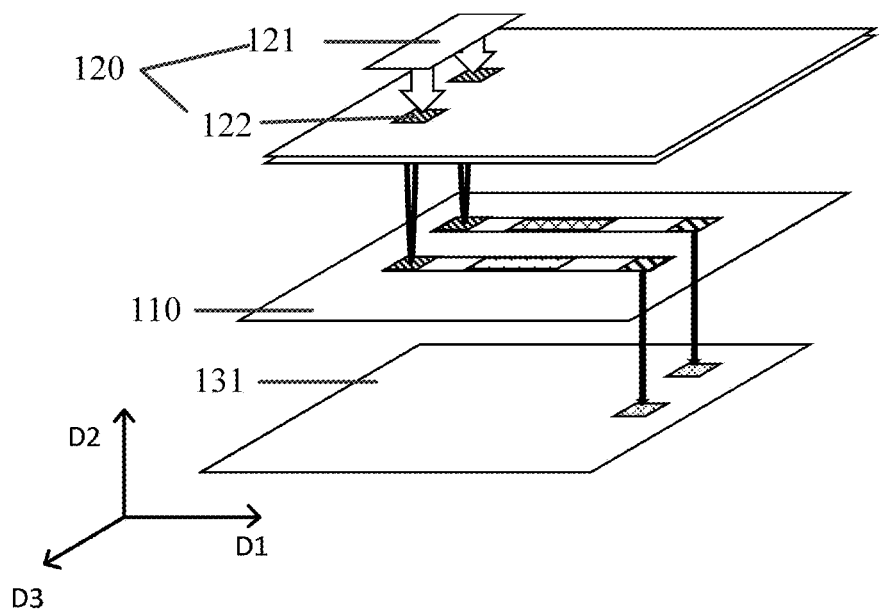
FIG. 2 is a schematic diagram of an example of the fluid detection panel as illustrated in FIG. 1.
Figure 3:
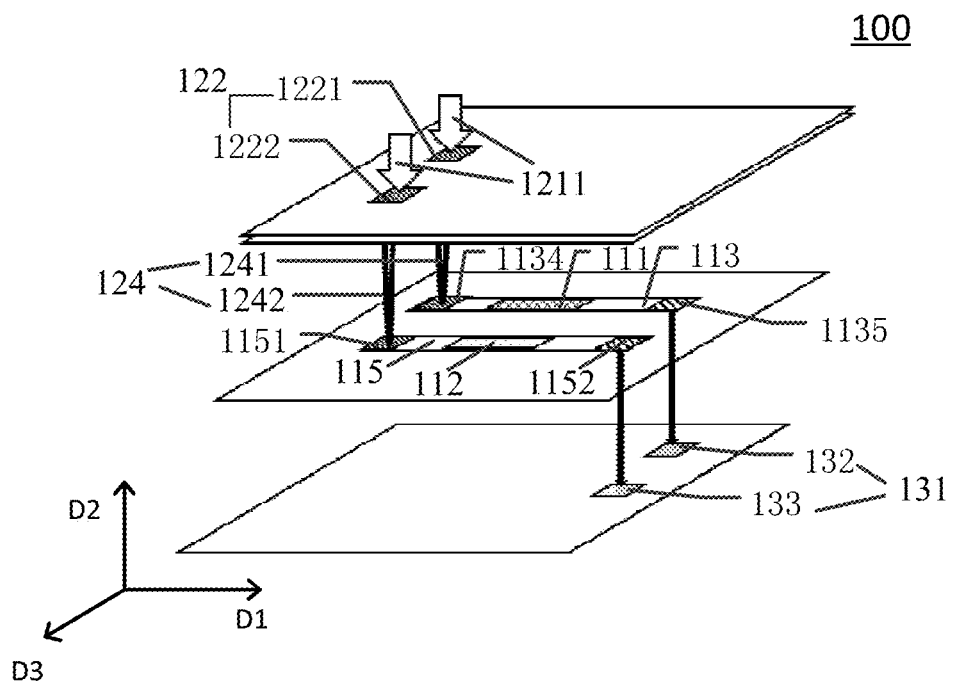
FIG. 3 is another schematic diagram of the fluid detection panel as illustrated in FIG. 2.

FIG. 2 illustrates a schematic diagram of an example of the fluid detection panel 100 as illustrated in FIG. 1. FIG. 3 is another schematic diagram of the fluid detection panel 100 as illustrated in FIG. 2. Compared with FIG. 2, FIG. 3 further illustrates detailed structures of the microfluidic substrate 110, the optical unit 120 and the sensor 131.

The optical unit 120 of the fluid detection panel 100 will be exemplarily described below.

In the example as illustrated in FIG. 2, the optical unit 120 includes a light source 121 and a filter structure 122. The light source 121 emits a second light 1211 toward the filter structure 122. The filter structure 122 is configured to filter the second light 1211 emitted by the light source 121 to obtain the first light 124, and the filter structure 122 is further configured to allow the first light 124 to be incident on the sample detection area 111 and the comparison detection area 112. Because the full width at half maximum (FWHM) of the first light 124 is less than the FWHM of the second light 1211 (that is, the monochromaticity of the first light 124 is superior to the monochromaticity of the second light 1211), the filter structure 122 is provided in the optical unit 120 to reduce the full width at half maximum of the first light 124 for sample detection, such that the detection accuracy of the fluid detection panel 100 can be improved.

For example, filtering parameters (i.e., filtering characteristics) of the filter structure 122 may be determined based on spectral absorption characteristics of the liquid sample to be detected. For example, at least one spectral absorption peak of the liquid sample to be detected at least partially overlaps the transmission spectrum of the filter structure 122. For example, in order to increase the detection sensitivity, the peak wavelength of the strongest spectral absorption peak of the liquid sample to be detected may be substantially same as the peak transmission wavelength of the filter structure 122. For example, in order to improve the detection accuracy, the full width at half maximum of the transmission spectrum of the filter structure 122 may be less than or equal to that of the strongest spectral absorption peak of the liquid sample to be detected.

For example, the filter structure 122 may be a transmissive filter structure. For example, a Fabry-Perot microcavity resonant type filter structure, a transmissive waveguide grating, a transmissive holographic grating, or other suitable transmissive filter structures may be used as the filter structure 122. For example, for the sake of clarity, specific implementation of the filter structure 122 and filtering principle are not specifically described here, and will be exemplarily explained in the example as illustrated in FIGS. 12A to 12D by taking the Fabry-Perot microcavity resonant type filter structure as an example.

For example, the fluid detection panel 100 provided by some embodiments of the present disclosure is exemplarily explained by taking the optical unit 120 including the light source 121 and the filter structure 122 as an example, but the embodiments of the present disclosure are not limited thereto. For example, in a case where the full width at half maximum of the light emitted by the light source 121 of the optical unit 120 is relatively small, the optical unit 120 may not include the filter structure 122, and no further description will be given here.

For example, the light source is located at the side of the filter structure away from the microfluidic substrate. For example, the orthographic projections of the light source and the filter structure on the sensor 131 are at least partially overlapped.

Figure 4A:
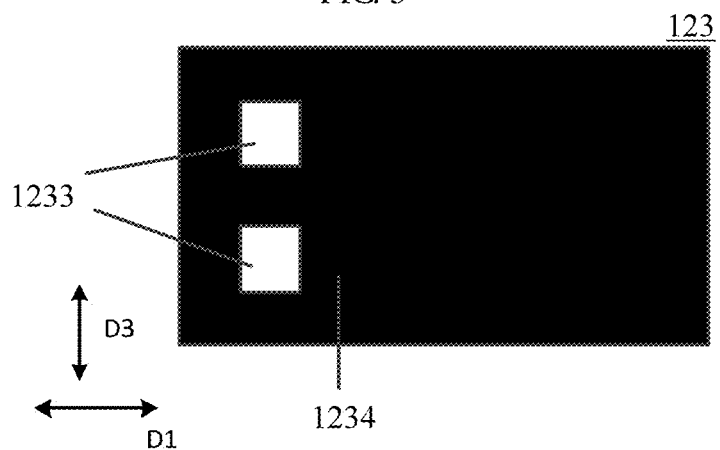
FIG. 4A is a schematic plan view of a first substrate provided by some embodiments of the present disclosure.
Figure 4B:
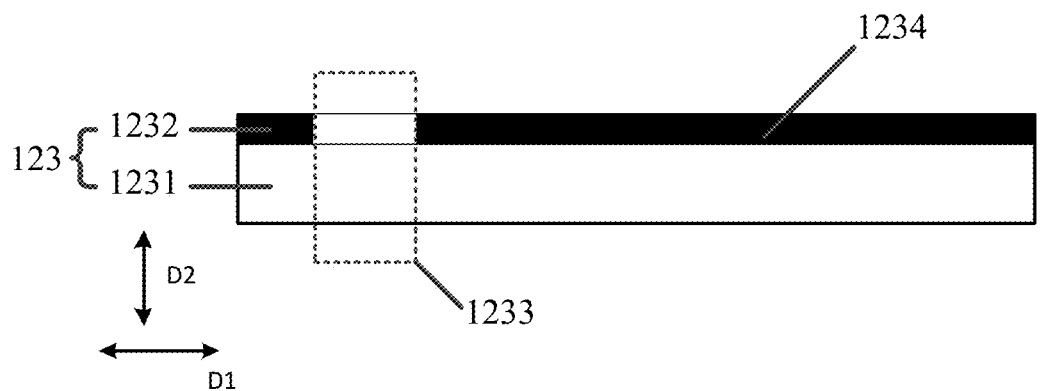
FIG. 4B is a schematic sectional view of the first substrate as illustrated in FIG. 4A.

For example, in some embodiments, the optical unit 120 further includes a first substrate. FIG. 4A is a schematic plan view of a first substrate 123 provided by some embodiments of the present disclosure. As illustrated in FIG. 4A, the first substrate 123 includes a light transmitting region 1233 and a light shielding region 1234. FIG. 4B is a schematic sectional view of the first substrate 123 as illustrated in FIG. 4A. As illustrated in FIG. 4B, the first substrate 123 includes a transparent base substrate 1231 and a first light shielding layer 1232. The first light shielding layer 1232 includes an opening, the opening of the first light shielding layer 1232 corresponds to the light transmitting region of the first substrate 123, and the area other than the opening of the first light shielding layer 1232 corresponds to the light shielding region 1234 of the first substrate 123. For example, the first light shielding layer 1232 may be made of a material for fabricating a black matrix, such as a black resin material, a metal oxide material with dark color, or the like.

Figure 4C:
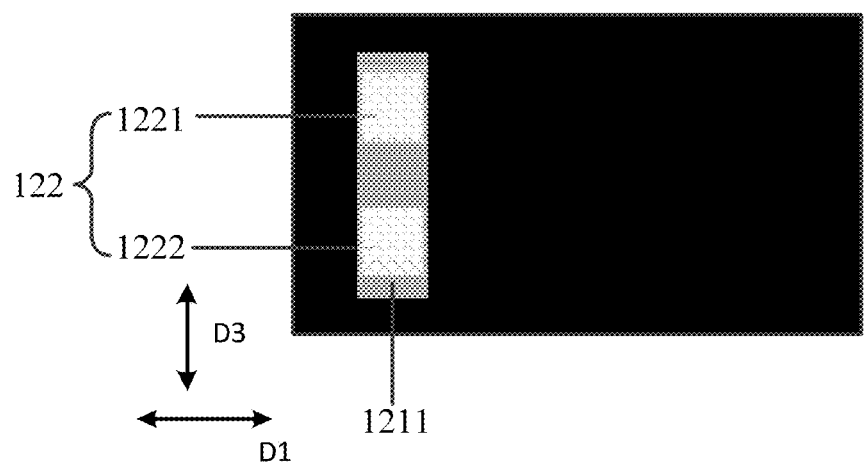
FIG. 4C is a schematic plan view of a filter structure and the first substrate as illustrated in FIG. 3.

FIG. 4C is a schematic plan view of the filter structure 122 and the first substrate 123 as illustrated in FIG. 3. As illustrated in FIG. 4C, the filter structure 122 is provided in the light transmitting region 1233 of the first substrate 123, the filter structure 122 includes a filter substructure 1221 and a second filter substructure 1222 which are spaced apart from each other, and the second light 1211 emitted by the light source 121 is incident onto the first filter substructure 1221 and the second filter substructure 1222 simultaneously. As illustrated in FIG. 3, the first filter substructure 1221 and the second filter substructure 1222 filter the second light 1211 respectively to obtain a first light beam 1241 and a second light beam 1242, the first light beam 1241 and the second light beam 1242 have the same characteristics, and the first light beam 1241 and the second light beam 1242 are respectively guided and incident on the sample detection area 111 and the comparison detection area 112. The first light beam 1241 and the second light beam 1242 have the same characteristics, and their combination is referred to as the first light 124. That is, the first light beam 1241 and the second light beam 1242 are regarded as different portions of the first light 124. The first light 124 is incident on the sample detection area 111 and the comparison detection area 112 simultaneously. For example, in a detection operation, the first light beam 1241 is used as detection light, and the second light beam 1242 is used as reference light. For example, the first filter substructure 1221 is not superimposed with the sample detection area 111 in the second direction D2, and the second filter substructure 1222 is not superimposed with the comparison detection region 112 in the second direction D2. For example, the orthographic projection of the sample detection area 111 on the sensor 131 is spaced apart from the orthographic projection of the filter structure 122 on the sensor 131.

Figure 4D:
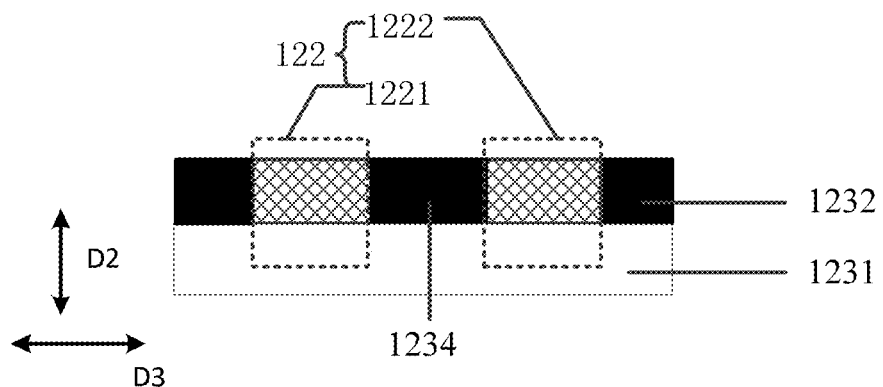
FIG. 4D is a schematic sectional view of the filter structure and the first substrate as illustrated in FIG. 4C.

FIG. 4D is a schematic sectional view of the filter structure 123 and the first substrate 123 as illustrated in FIG. 4C. As illustrated in FIG. 4D, the filter structure 122 may be provided on the light-transmitting base substrate 1231 and located in the opening of the first light shielding layer 1232, and the first filter substructure 1221 and the second filter substructure 1222 are spaced by the light shielding region 1234. As illustrated in FIG. 3, because the first filter substructure 1221 and the second filter substructure 1222 are spaced by the light shielding region 1234, the second light 1211 that is incident on the light shielding region 1234 between the first filter substructure 1221 and the second filter substructure 1222 is shielded by the light shielding region 1234 and cannot pass through the first substrate 123, the first light beam 1241 and the second light beam 1242 are spaced apart from each other; in this case, the potential interference caused by the first light beam 1241 on the comparison detection area 112 may be avoided, and the potential interference caused by the second light beam 1242 on the sample detection area 111 may be avoided, and thus the design and fabrication requirement of the fluid detection panel 100 on the light source 121, the first filter substructure 1221 and the second filter substructure 1222 can be reduced.

For example, the first filter substructure 1221 and the second filter substructure 1222 have the same filtering parameters, for example, the first filter substructure 1221 and the second filter substructure 1222 are obtained by dividing the same filter structure into two parts. For example, the first filter substructure 1221 and the second filter substructure 222 have the same structural parameters. For example, in the case where the filtering parameters of the first filter substructure 1221 and the second filter substructure 222 are also related to the parameters of driving signals applied on the first filter substructure 1221 and the second filter substructure 222, the parameters of the driving signals of the first filter substructure 1221 and the second filter substructure 222 are also the same. Therefore, based on the same second light, the parameter of the first light beam 1241 outputted by the first filter substructure 1221 and the parameter of the second light beam 1242 outputted by the second filter substructure 1222 match with each other (for example, the same). For example, the spectrum (the peak wavelength and the full width at half maximum) of the first light beam 1241 is equal to the spectrum of the second light beam 1242, and the ratio of the light intensity of the first light beam 1241 to the light intensity of the second light beam 1241 is a constant value (for example, the ratio is equal to one at any time). For example, at any one time point, the spectra of the first light beam 1241 and the second light beam 1242 are the same and the ratio of light intensities is a constant value (for example, the ratio of light intensities is equal to one at any time). Therefore, the optical unit 120 as illustrated in FIGS. 2 and 3 can reduce the adverse effect of the fluctuation (for example, at least one of intensity fluctuation and spectral fluctuation) of the second light 1211 emitted by the light source 121 on the detection result. For the sake of clarity, the specific principle will be explained below, and no further description will be given here.

Figure 4E:
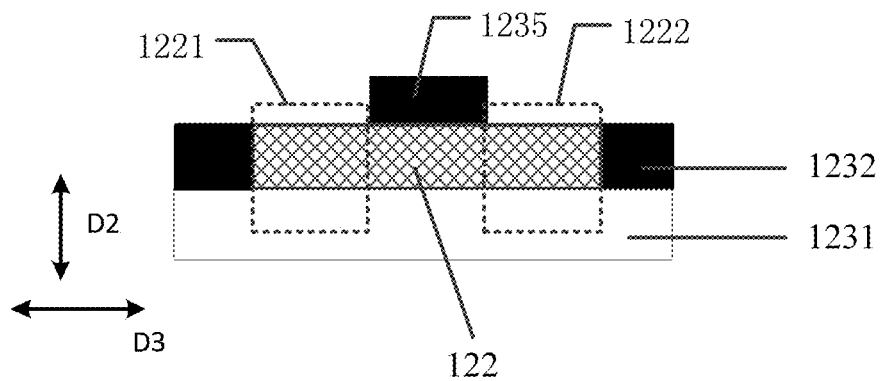
FIG. 4E is another schematic sectional view of the filter structure and the first substrate as illustrated in FIG. 4C.

FIG. 4E is another schematic sectional view of the filter structure 122 and the first substrate 123 as illustrated in FIG. 4C. As illustrated in FIG. 4E, the first filter substructure 1221 and the second filter substructure 222 are partial areas of the filter structure 122. Therefore, the filter parameters of the first filter substructure 1221 and the second filter substructure 222 are the same, the parameter of the first light beam 1241 outputted by the first filter substructure 1221 and the parameter of the second light beam 1242 outputted by the second filter substructure 1222 are the same, thereby reducing the adverse effect of the fluctuation (for example, at least one of the intensity fluctuation and the spectral fluctuation) of the second light 1211 emitted by the light source 121 on the detection result.

As illustrated in FIG. 4E, the area of the filter structure 122 between the first filter substructure 1221 and the second filter substructure 222 is shielded by the second light shielding layer 1235, and thus the second light 1211 that is incident on the area between the first filter substructure 1221 and the second filter substructure 222 is shielded by the second light shielding layer 1235 and cannot pass through the first substrate 123, and therefore, the first light beam 1241 and the second light beam 1242 are spaced apart from each other; in this case, the potential interference caused by the first light beam 1241 on the comparison detection area 112 may be avoided, and the potential interference caused by the second light beam 1242 on the sample detection area 111 may be avoided, and thus the design and fabrication requirement of the fluid detection panel 100 on the light source 121, the first filter substructure 1221 and the second filter substructure 1222 can be reduced.

It should be noted that, for the sake of clarity, FIGS. 2 and 3 only illustrate the second light 1211 that is emitted by the light source 121 and incident on the first filter substructure 1221 and the second light 1211 that is emitted by the light source 121 and incident onto the second filter substructure 1222, and does not illustrate the second light 1211 that is emitted by the light source 121 and incident on the light shielding region 1234 of the first substrate 123. However, those skilled in the art can understand that the second light 1211 that is incident on the first filter substructure 1221 and the second light 1211 that is incident onto the second filter substructure 1222 come from the same light source 121 and have the same parameters (for example, having the same spectrum and the same light intensity).

For example, at least one parameter (color, wavelength, etc.) of the second light emitted by the light source 121 may be a fixed value or determined according to the spectral absorption characteristic of the liquid sample to be detected, and the at least one spectral absorption peak of the liquid sample to be detected at least partially overlaps the spectrum of the light emitted by the light source 121. For example, for cyanine dyes, one of the spectral absorption peaks thereof ranges from 380 nm to 600 nm, and the peak absorption wavelength is about 505 nm. Therefore, the light source capable of emitting blue or green light (for example, the peak wavelength of the second light emitted by the light source 121 is about 505 nm) may be adopted. For example, in order to increase the detection sensitivity, the peak wavelength of the strongest spectral absorption peak of the liquid sample to be detected may be substantially equal to the peak wavelength of the light emitted by the light source 121.

For example, the light source 121 may be a monochromatic light source or a multi-color light source (a polychromatic light source). For example, in the case where the light source 121 is a monochromatic light source, the light emitted by the light source 121 may be one of red light, green light, blue light, violet light, infrared light, and ultraviolet light. For example, in the case where the light source 121 is a multi-color light source, the light emitted by the light source 121 may be white light, or other mixed light.

For example, the light emitted by the light source 121 may be collimated light, i.e., the light emitted by the light source 121 have substantially the same propagation direction. In one example, the light source 121 may include a laser (for example, a semiconductor laser). For example, the light source 121 includes a red laser, a green laser and a blue laser, and light emitted by the red laser (for example, a red laser chip), the green laser (for example, a green laser chip) and the blue laser (for example, a blue laser chip) are mixed to form white light. In another example, the light source 121 may further include a light emitting diode (a light emitting diode chip) having a relatively good collimation, and the light emitted by the light emitting diode has a relatively small divergence angle. For example, the light source 121 may include a white light emitting diode; for another example, the light source 121 may also include a red light emitting diode, a green light emitting diode and a blue light emitting diode, and the light emitted by the red light emitting diode, the green light emitting diode and the blue light emitting diode are mixed to obtain white light. For example, the light emitting diode may be an inorganic light emitting diode (for example, a micro LED) or an organic light emitting diode. In still another example, the light source 121 may also include a fluorescent lamp (for example, a cold cathode fluorescent lamp, CCFL) and a collimating structure (for example, a lens) provided at the light outgoing side (light emitting side) of the fluorescent lamp.

For example, in order to match the beam width of the light emitted by the light source 121 with the size of the filter structure 122, the light source 121 with the size of the light emitting surface (for example, the light emitting surface of a laser chip or an LED chip stripe) of the light source 121 being matched with the size of the filter structure 122 may be adopted. The light source 121 may also be provided with a beam expanding structure (for example, a lens or a lens group) at the light outgoing side of the light source 121.

The microfluidic substrate 110 of the fluid detection panel 100 will be exemplarily described below.

Figure 5:
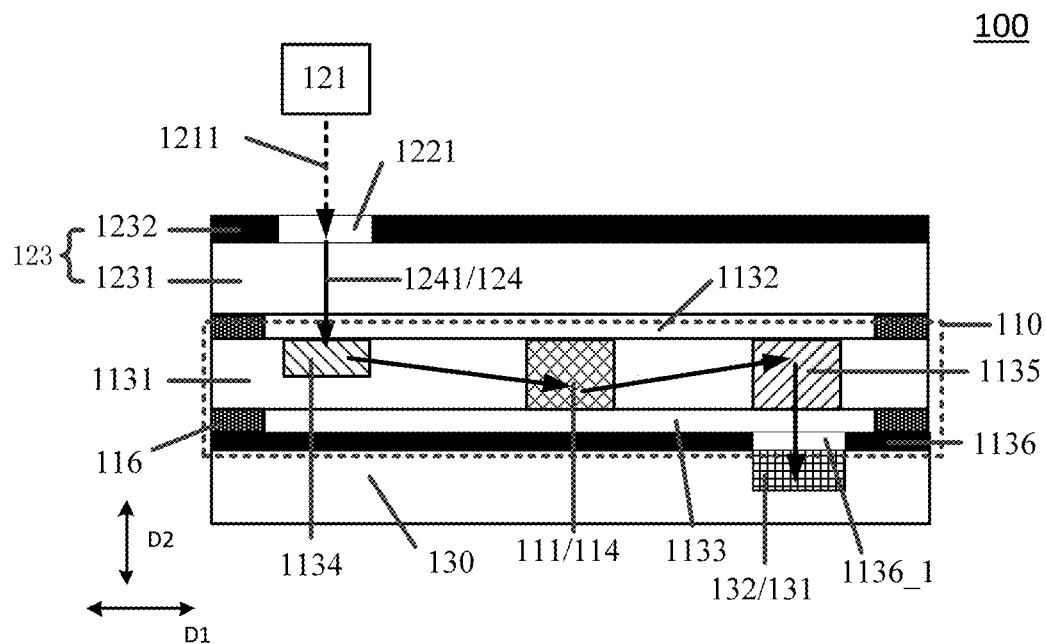
FIG. 5 is a schematic sectional view of the fluid detection panel as illustrated in FIG. 3.

FIG. 5 is an exemplary schematic sectional view of the fluid detection panel 100 as illustrated in FIG. 3 (corresponding to the cross section of a first optical waveguide structure 113 as illustrated in FIG. 3). As illustrated in FIG. 5, the microfluidic substrate 110 further includes a first optical waveguide structure 113, and the first optical waveguide structure 113 is configured to allow the first light 124 (e.g., the first light beam 1241) to propagate in the first optical waveguide structure 113 based on total reflection.

For example, the first optical waveguide structure 113 extends in a first direction D1, and the first light beam 1241 propagates in the first optical waveguide structure 113 along the first direction D1 (e.g., propagated from the left side to the right side in FIG. 5). The first direction D1, the second direction D2 and the third direction D3 are intersected with each other (for example, perpendicular to each other).

As illustrated in FIG. 5, the first optical waveguide structure 113 includes a core layer 1131, a first cladding layer 1132 and a second cladding layer 1133, and the first optical waveguide structure 113 is configured to allow the first light 124 to be propagated in the core layer 1131 based on total reflection.

As illustrated in FIG. 5, the first optical waveguide structure 113 further includes a first light in-coupling structure 1134 and a first light out-coupling structure 1135. As illustrated in FIG. 5, the first light in-coupling structure 1134 is configured to couple the first light 124 that is incident on the first light in-coupling structure 1134 into the first optical waveguide structure 113 (for example, into the core layer 1131 of the first optical waveguide structure). For example, the first light in-coupling structure 1134 may change the propagation angle of at least part of the first light 124 that is incident on the first light in-coupling structure 1134, and allow the angle between the propagation angle of the portion, the propagation angle of which is changed, of the first light 124 (the first light beam 1241) and the direction (for example, the second direction D2) perpendicular to the first optical waveguide structure 113 to be greater than the total reflection angle of the first optical waveguide structure 113, such that the portion, the propagation angle of which is changed, of the first light 124 satisfies the total reflection condition of the first optical waveguide structure 113, and can be propagated in the first optical waveguide structure 113 based on total reflection.

As illustrated in FIG. 5, the first light out-coupling structure 1135 is configured to allow the first light 124 propagated in the first optical waveguide structure 113 (for example, the first light 124 propagated in the core layer 1131 of the optical waveguide structure) to be outputted from first optical waveguide structure 113 and be incident on the sensor 131. For example, the first light out-coupling structure 1135 may change the propagation angle of at least part of the first light 124 that is incident on the first light out-coupling structure 1135, such that the portion, the propagation angle of which is changed, of the first light 124 no longer satisfies the total reflection condition of the first optical waveguide structure 113, and leaves the first optical waveguide structure 113 via the first light out-coupling structure 1135. For the sake of clarity, specific structures of the first light in-coupling structure 1134 and the first light out-coupling structure 1135 will be explained below, and no further description will be given here.

Figure 6:
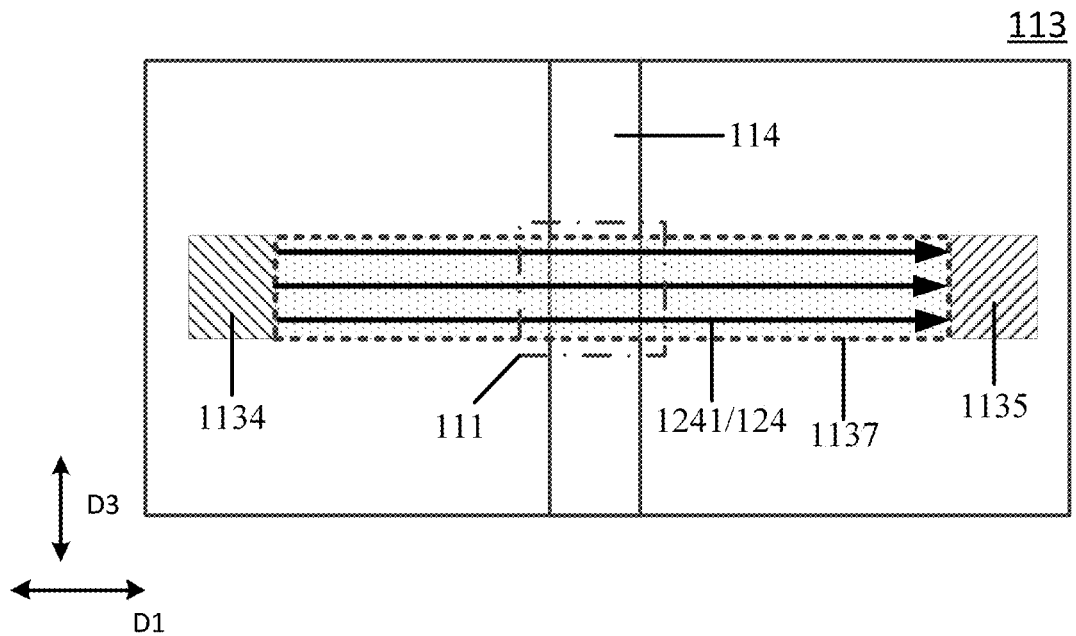
FIG. 6 is a schematic plan view of a first optical waveguide structure of the fluid detection panel as illustrated in FIG. 5.

FIG. 6 is a schematic plan view of the first optical waveguide structure 113 of the fluid detection panel 100 as illustrated in FIG. 5. As illustrated in FIGS. 5 and 6, the first light 124 (the first light beam 1241) that is incident into the first optical waveguide structure 113 propagates from the first light in-coupling structure 1134 toward the first light out-coupling structure 1135, and thus, the area between the first light in-coupling structure 1134 and the first light out-coupling structure 1135 (i.e., the area located between the first light in-coupling structure 1134 and the first light out-coupling structure 1135 and configured for transmitting the first light beam 1241) is the propagation passage of the first optical waveguide structure 113. For example, in operation, the first light beam 1241 propagates from the first light in-coupling structure 1134 to the first light out-coupling structure 1135 via the propagation passage of the first optical waveguide structure 113.

As illustrated in FIGS. 5 and 6, the microfluidic substrate 110 further includes a flow passage 114 provided in the optical waveguide structure (in the core layer 1131), and the extension direction of the flow passage 114 is intersected with (for example, perpendicular to) the propagation passage of the first light 124 propagated in the first optical waveguide structure 113. In this case, when the liquid sample arrives at the area (that is, the sample detection area 111), that is intersected with the propagation passage of the first optical waveguide structure 113, of the flow passage 114, the first light beam 1241 propagated in the first optical waveguide structure 113 is incident onto the liquid sample and reacts with the liquid sample (for example, at least part of the light of the first light beam 1241 is absorbed by the liquid sample); and then, the first light beam 1241 carrying the information of the liquid sample leaves the flow passage 114 and continues to propagate in the core layer 1131; afterwards, the first light beam 1241 carrying the information of the liquid sample is incident on the first light out-coupling structure 1135, and leaves the first optical waveguide structure 113 under the action of the first light out-coupling structure 1135 and is incident onto the sensor 131 (the first photosensitive area 132 of the sensor 131); and finally, the sensor 131 provides a detection signal based on the collected first light beam 1241.

For example, by providing the flow passage 114 in the optical waveguide structure, the reaction between the first light 124 and the liquid sample can be more sufficient. For example, the first light 124 can react with more liquid samples or the time during which the first light 124 reacts with the liquid sample is increased (in the case where the liquid sample to be detected is flowing during detection) by increasing the size of the propagation passage of the first optical waveguide structure 113 in the third direction D3. In this case, the detection sensitivity and the range of applications (for example, the fluid detection panel 100 can be used for detecting the liquid sample with a lower concentration and/or a trace amount of liquid sample) of the fluid detection panel 100 can be improved without increasing the thickness of the flow passage 114 (the thickness in the second direction D2).

It should be noted that, according to actual application requirements, at least partial area of the flow passage 114 may also overlap with the propagation passage of the first light waveguide structure 113. For example, the extension direction of at least partial area of the flow passage 114 (i.e., the propagation direction of the liquid sample in at least partial area of the flow passage 114) is the same as the extension direction of the propagation passage of the first light waveguide structure 113, and the at least partial area of the flow passage 114 overlaps with the propagation passage of the first light waveguide structure 113. In this case, the distance and time of the reaction between the first light 124 and the liquid sample may be further increased without increasing the size of the propagation passage of the first optical waveguide structure 113 in the third direction D3, thereby reducing the size of the fluid detection panel 100. For example, in the case where at least partial area of the flow passage 114 overlaps with the propagation passage of the first optical waveguide structure 113, the fluid detection panel 100 may be configured for detecting the liquid sample with a relatively large refractive index, for example, detecting the liquid sample with a refractive index being greater than the refractive index of the first and second cladding layers 1132 and 1133.

Figure 7:
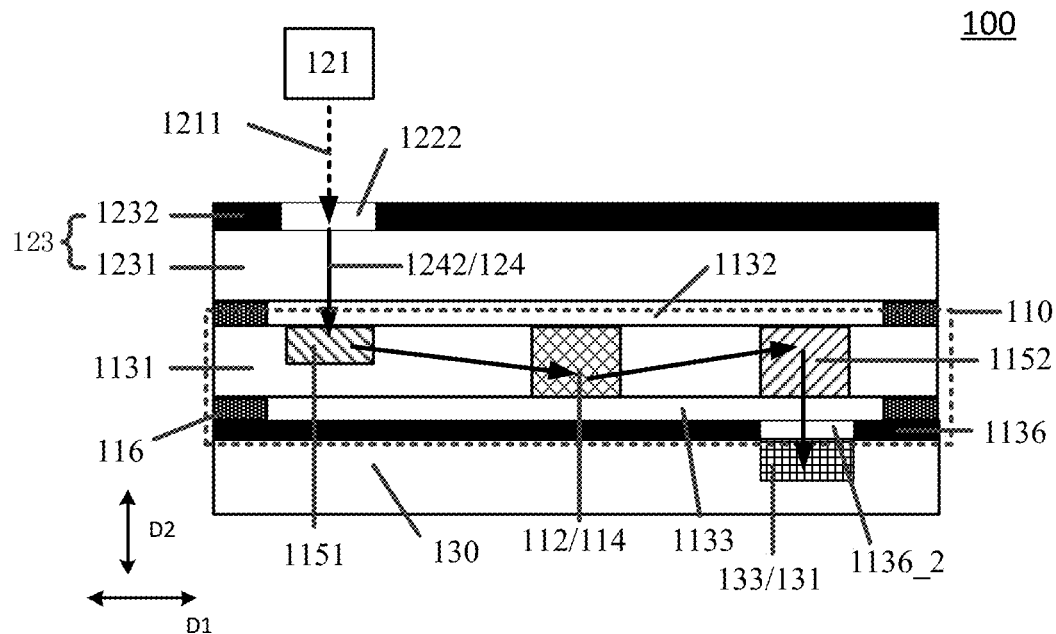
FIG. 7 is another schematic sectional view of the fluid detection panel as illustrated in FIG. 3.

As illustrated in FIG. 3, the microfluidic substrate 110 further includes a second optical waveguide structure 115, and the second optical waveguide structure 115 and the first optical waveguide structure 113 are arranged in parallel in the third direction D3, for example, the second optical waveguide structure 115 and the first optical waveguide structure 113 are directly connected with each other. FIG. 7 is another schematic sectional view of the fluid detection panel 100 as illustrated in FIG. 3, i.e., FIG. 7 is corresponding to the schematic sectional view of the second optical waveguide structure 115 in FIG. 3. As illustrated in FIG. 7, the second optical waveguide structure 115 is configured to allow the first light 124 (for example, the second light beam 1242) to be propagated in the second optical waveguide structure 115 based on total reflection. As illustrated in FIG. 7, the second optical waveguide structure 115 includes a core layer 1131, a first cladding layer 1132 and a second cladding layer 1133, and the second optical waveguide structure 115 is configured to allow the first light 124 to be propagated in the core layer 1131 based on total reflection.

For example, the second optical waveguide structure 115 and the first optical waveguide structure 113 are integrally formed. For example, the core layer 1131 of the second optical waveguide structure 115 and the core layer 1131 of the first optical waveguide structure 113 are integrally formed, and no interface is between the core layer 1131 of the second optical waveguide structure 115 and the core layer 1131 of the first optical waveguide structure 113; the first cladding layer 1132 of the second optical waveguide structure 115 and the first cladding layer 1132 of the first optical waveguide structure 113 are integrally formed, and no interface is formed between the first cladding layer 1132 of the second optical waveguide structure 115 and the first cladding layer 1132 of the first optical waveguide structure 113; the second cladding layer 1133 of the second optical waveguide structure 115 and the second cladding layer 1133 of the first optical waveguide structure 113 are integrally formed, and no interface is formed between the second cladding layer 1133 of the second optical waveguide structure 115 and the second cladding layer 1133 of the first optical waveguide structure 113. For the sake of clarity, the core layer 1131, the first cladding layer 1132 and the second cladding layer 1133 of the second optical waveguide structure 115 as illustrated in FIG. 7 respectively adopt the same reference numerals as the core layer 1131, the first cladding layer 1132 and the second cladding layer 1133 of the first optical waveguide structure 113 as illustrated in FIG. 5.

As illustrated in FIG. 7, the second optical waveguide structure 115 further includes a second light in-coupling structure 1151 and a second light out-coupling structure 1152. As illustrated in FIG. 7, the second light in-coupling structure 1151 is configured to couple the first light 124 (the second light beam 1242) that is incident on the second light in-coupling structure 1151 into the second optical waveguide structure 115 (for example, into the core layer 1131 of the optical waveguide structure). For example, the second light in-coupling structure 1151 may change the propagation angle of at least part (for example, all) of the first light 124 that is incident on the second light in-coupling structure 1151, and allow the angle between the propagation angle of a portion, the propagation angle of which is changed, of the first light 124 (the second light beam 1241) and the direction (for example, the second direction D2) perpendicular to the second optical waveguide structure 115 to be greater than the total reflection angle of the second optical waveguide structure 115, such that the portion, the propagation angle of which is changed, of the first light 124 satisfies the total reflection condition of the second optical waveguide structure 115, and can be propagated in the second optical waveguide structure 115 based on total reflection.

As illustrated in FIG. 7, the second light out-coupling structure 1152 is configured to allow the first light 124 propagated in the second optical waveguide structure 115 (for example, the first light 124 propagated in the core layer 1131 of the optical waveguide structure) to be coupled out and incident on the sensor 131. For example, the second light out-coupling structure 1152 may change the propagation angle of at least part of the first light 124 that is incident on the second light out-coupling structure 1152, such that a portion, the propagation angle of which is partially changed, of the first light 124 no longer satisfies the total reflection condition of the second optical waveguide structure 115, and leaves the second optical waveguide structure 115 via the second light out-coupling structure 1152. For example, the second light in-coupling structure 1151 has the same parameters as the first light in-coupling structure 1134. In some embodiments, the second light out-coupling structure 1152 has the same parameters as the second light in-coupling structure 1151, and the first light out-coupling structure 1135 has the same parameters as the first light in-coupling structure 1134. In some other embodiments, the second light out-coupling structure 1152 has the same parameters as the second light in-coupling structure 1151, and the second light out-coupling structure 1152 and the second light in-coupling structure 1151 enable the light outputted by the second light out-coupling structure 1152 and the light outputted by the first light out-coupling structure 1151 to have the same light intensity but different propagation angles.

Figure 8:
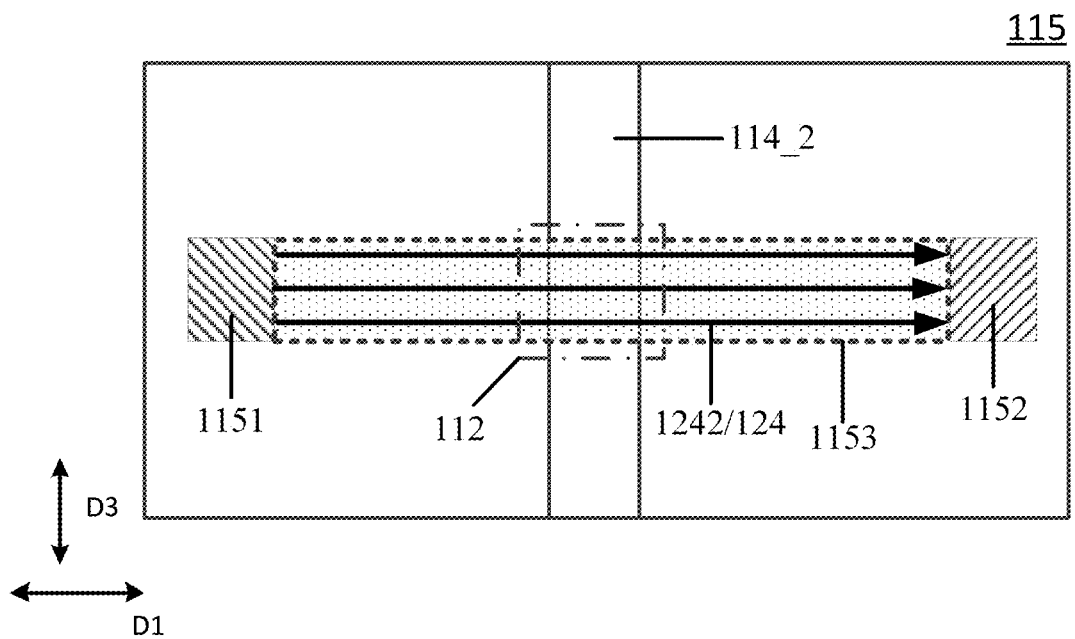
FIG. 8 is a schematic plan view of a second optical waveguide structure of the fluid detection panel as illustrated in FIG. 7.

FIG. 8 is a schematic plan view of the second optical waveguide structure 115 of the fluid detection panel 100 as illustrated in FIG. 7. As illustrated in FIGS. 7 and 8, the first light 124 (the second light beam 1242) that is incident into the second optical waveguide structure 115 propagates from the second light in-coupling structure 1151 toward the second light out-coupling structure 1152, and thus, the area between the second light in-coupling structure 1151 and the second light out-coupling structure 1152 (i.e., the area located between the second light in-coupling structure 1151 and the second light out-coupling structure 1152 and configured for transmitting the second light beam 1242) is the propagation passage of the second optical waveguide structure 115. For example, in operation, the second light beam 1242 propagates from the second light in-coupling structure 1151 to the second light out-coupling structure 1152 via the propagation passage of the second optical waveguide structure 115.

As illustrated in FIG. 8, the microfluidic substrate 110 further includes a second flow passage 114_2 provided in the optical waveguide structure (in the core layer 1131), and the extension direction of the second flow passage 114_2 is intersected with (for example, perpendicular to) the propagation passage of the second light beam 1242 in the second optical waveguide structure 115, and the area, that is intersected with the propagation passage of the second optical waveguide structure 115, of the second flow passage 114_2 is the comparison detection area 112. For example, the parameter of the region, which is corresponding to the comparison detection area 112, of the second flow passage 114_2 is the same as the parameter of the region, which is corresponding to the sample detection area 111, of the first flow passage 114. In this case, the influence (e.g., the influence on the phase or intensity of beam) of the second flow passage 114_2 on the second light beam 1242 is the same as the influence of the flow passage 114 on the first light beam 1241.

For example, in the detection operation, the liquid sample (for example, the comparison liquid sample, or the liquid sample for comparison) does not flow through the second flow passage 114_2, and the second light beam 1242 propagated in the second optical waveguide structure 115 directly passes through the comparison detection area 112 without reacting with the liquid sample (for example, the comparison liquid sample); then, the second light beam 1242 is incident on the second light out-coupling structure 1152, and leaves the second optical waveguide structure 115 under the action of the second light out-coupling structure 1152 and the second light beam 1242 is incident onto the sensor 131 (the second photosensitive area of the sensor 131); finally, the sensor 131 provides a comparison signal based on the collected second light beam 1242.

For example, the parameter of the first light beam 1241 outputted by the first filter substructure 1221 is the same as the parameter of the second light beam 1242 outputted by the second filter substructure 1222, and thus the parameter of the first light beam 1241 that is incident onto the first light in-coupling structure 1134 is the same as the parameter of the second light beam 1242 that is incident onto the second light in-coupling structure 1151; because of the following reasons, the influence of the entire light propagation path of the first light beam 1241 on the first light beam 1241 is substantially the same as the influence of the entire light propagation path of the second light beam 1242 on the second light beam 1242: the parameter of the first light in-coupling structure 1134 is substantially the same as the parameter of the second light in-coupling structure 1151; the influence of the first optical waveguide structure 113 on the first light beam 1241 is substantially the same as the influence of the second optical waveguide structure 115 on the second light beam 1242 (in the case where no liquid sample is present in the first optical waveguide structure 113); and the parameter of the second light out-coupling structure 1152 is substantially the same as that of the first light out-coupling structure 1135. Therefore, the calibrated detection signal may be obtained based on the comparison signal and the detection signal (for example, the detection signal is calibrated using the comparison signal, so as to obtain the calibrated detection signal), and the calibrated detection signal may be used to acquire information related to the liquid sample, for example, the substance contained in the liquid sample or/and the concentration of the substance contained in the liquid sample.

For example, because the influence of the fluctuation (the spectral fluctuation and/or the fluctuation of the light intensity) of the second light emitted by the light source 121 and the influence of the environmental change on the characteristics of the light propagation path are subtracted from (eliminated from) the detection signal, the influence of the fluctuations of the light outputted by the light source 121 and the environmental change on the detection result outputted by the fluid detection panel 100 can be reduced by providing the second filter substructure 1222 and the second optical waveguide structure 115, thereby not only improving the accuracy of the detection result outputted by the fluid detection panel as illustrated in FIG. 3, lowering the demands of the fluid detection panel 100 on the stability of the light source 121, but also improving the robustness of the fluid detection panel 100 as illustrated in FIG. 3 and its range of applications (for example, applied in on-site detection outside the laboratory).

For example, when the liquid sample comprises a liquid matrix substance (for example, water, an organic solvent, etc.) and a substance to be detected, the substance to be detected is dispersed in the matrix substance, and the proportion of the substance to be detected in the liquid sample is relatively small, in the detection operation, the matrix material may be provided as a comparison liquid sample in the second flow passage 114_2, so as to subtract (eliminate) the influence caused by the matrix substance from the detection signal. For example, in the case where the liquid sample is water containing a trace amount of mercury, water may be provided in the second flow passage 114_2 as the comparison liquid sample, and in this case, the detection efficiency and the accuracy of the detection result of the fluid detection panel 100 can be further improved.

For example, the length (the length in the third direction D3) of the second flow passage 114_2 may be set according to actual application requirements. For example, in the case where there is no need to provide the comparison liquid sample in the second flow passage 114_2, the length of the second flow passage 114_2 may be equal to or slightly greater than the size, in the third direction, of the propagation passage of the second light beam 1242 in the second optical waveguide structure 115, thereby reducing the spacing between the first optical waveguide structure 113 and the second optical waveguide structure 115 in the third direction D3, and correspondingly reducing the size of the fluid detection panel 100.

For example, according to actual application requirements, the second optical waveguide structure 115 may not be provided therein with a flow passage 114. The information (additional comparison signal) of the influence of the flow passage 114 on the second light beam 1242 may be measured in advance and pre-stored in the fluid detection panel 100. The pre-stored information may be read (accessed) during the process of acquiring the calibrated detection signal based on the detection signal, the additional comparison signal, and the comparison signal, to eliminate the influence of the flow passage 114 on the first light beam 1241. For example, the information of the influence of the flow passage 114 on the first light beam 1241 may be obtained by the following test. First, in the case where no liquid sample is provided in the flow passage 114, the detection signal and the comparison signal can be acquired using the fluid detection panel 100, and then, the information of the influence of the flow passage 114 on the first light beam 1241 can be acquired based on the detection signal and the comparison signal.

The core layer 1131, the first cladding layer 1132 and the second cladding layer 1133 will be exemplarily described below with reference to FIGS. 5 and 7. For example, the core layer 1131 has a relatively high transmissivity (high transmittance, e.g., 90%) for the first light beam 124, so as to reduce the loss of the first light 124 caused by propagation in the first optical waveguide structure 113 and reduce the power consumption of the fluid detection panel 100. For example, the core layer 1131 may be made of a transparent inorganic material or a transparent resin. For example, the core layer 1131 may be made of silicon nitride (SiNx) with a refractive index of 1.7 to 1.9. For example, the thickness of the core layer 1131 (the thickness in the second direction D2) may be set according to actual application requirements, and no specific limitation will be given here in this respect.

For example, the thickness of the core layer 1131 may be relatively small (for example, 100 nanometers). For example, in the case where the thickness of the core layer 1131 is relatively small, the first optical waveguide structure 113 is a single mode optical waveguide, thereby better controlling the propagation directions of the first light beam 1241 that is incident into the first optical waveguide structure 113 via the first light in-coupling structure 1134 and the second light beam 1242 that is incident into the second optical waveguide structure 115 via the second light in-coupling structure 1151 in the core layer 1131, and better controlling the propagation directions of the light leaving the first optical waveguide structure 113 via the first light out-coupling structure 1135 and the light leaving the second optical waveguide structure 115 via the second light out-coupling structure 1152.

Figure 13A:
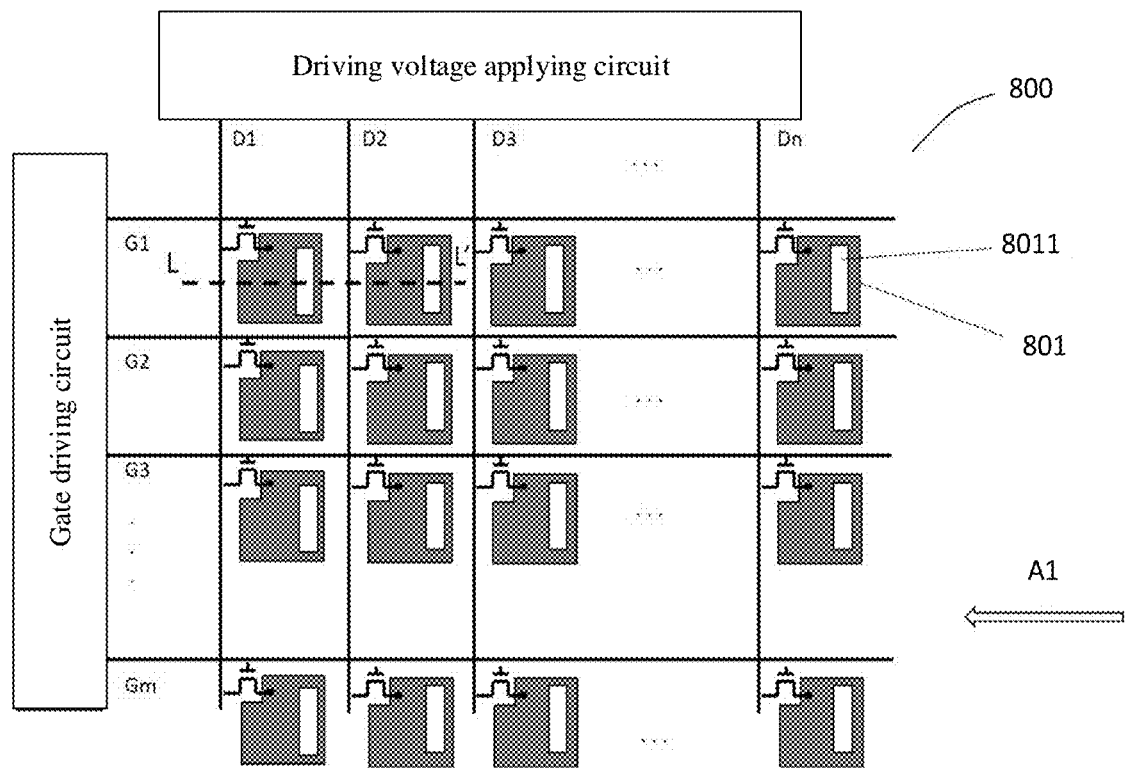
FIG. 13A is a schematic plan view of a driving electrode array of a microfluidic substrate provided by some embodiments of the present disclosure.
Figure 13B:
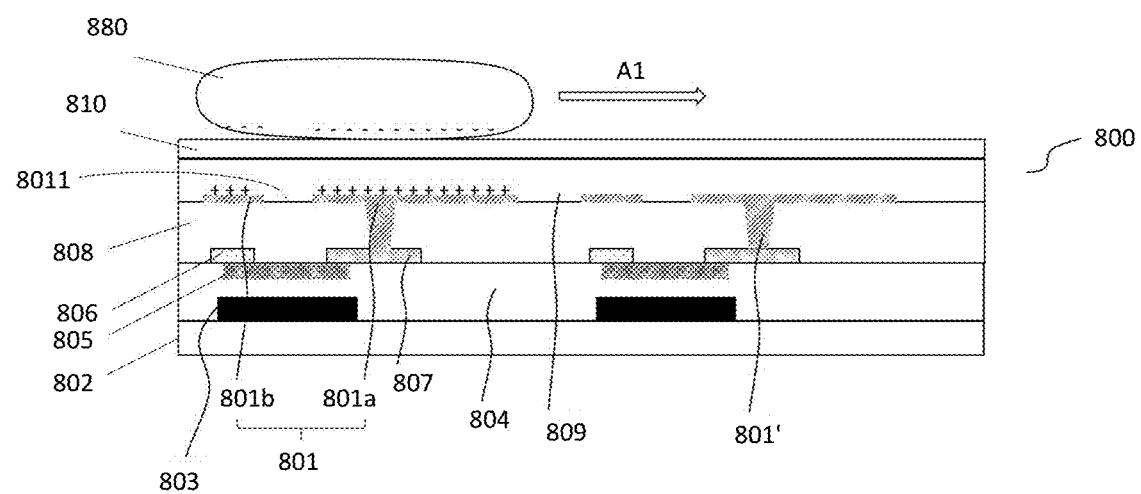
FIG. 13B is a schematic sectional view of the microfluidic substrate as illustrated in FIG. 13A along a L-L' line.

For example, the flow passage 114 may be formed in the optical waveguide structure (the core layer 1131) by means of photolithography and etching. For example, according to the actual application requirements, a hydrophobic membrane layer/hydrophilic membrane layer may be applied on an inner wall of the flow passage 114, such that the liquid sample may flow or temporarily stay in the flow passage 114 according to the detection demand. For example, Teflon-AF (amorphous fluoropolymer) can minimize the adhesion of the liquid sample on the inner wall of the flow passage 114 (a liquid flowing space), such that the liquid sample can flow in the flow passage 114 according to the detection demand. The microfluidic substrate 110 may drive the liquid sample to flow in the flow passage 114 according to a suitable principle, which is not limited in the embodiments of the present disclosure. For example, the microfluidic substrate 110 may drive the liquid sample to flow in the flow passage 114 according to dielectric wetting effect, ultrasonic waves, or gas flow. For the sake of clarity, an example of the microfluidic substrate 110 driving the liquid sample to flow in the flow passage 114 will be described in the embodiment as illustrated in FIG. 13A and FIG. 13B, and no further description will be given here.

As illustrated in FIG. 5, the core layer 1131 may be attached to the optical unit 120 through a plastic frame 116, and the core layer 1131 may also be attached to the sensor 131 through the plastic frame 116, and the plastic frame 116 is opposite to the peripheral area of the core layer 1131. In this case, the air gap between the core layer 1131 and the optical unit 120 forms the first cladding layer 1132 of the first optical waveguide structure 113, and the air gap between the core layer 1131 and the sensor 131 forms the second cladding 1133 of the first optical waveguide structure 113. Because the refractive index of the air for forming the first and second cladding layers 1132 and 1133 is less than the refractive index of the core layer 1131, the first optical waveguide structure 113 allows the first light 124 propagated in the core layer 1131 to be propagated based on total reflection.

For example, by making the refractive indices of the first and second cladding layers 1132 and 1133 as small as possible (for example, when the first and second cladding layers 1132 and 1133 are air layers, the refractive indices of the first and second cladding layers 1132 and 1133 are both equal to one), the range of choice of the material of the core layer 1131 can be increased, thereby reducing the difficulty in designing and fabricating the optical waveguide, and improving the detection performance of the fluid detection panel 100. For example, when both the first and second cladding layers 1132 and 1133 are formed by air, the first light 124 propagates in the core layer 1131 based on the total reflection so long as the refractive index of the material of the core layer 1131 is greater than one. In this case, a material with minimum loss for the first light 124 may be used, thereby further reducing the power consumption of the fluid detection panel 100; in addition, because the critical angle of the total reflection is relatively small, the difficulty in designing and fabricating the first light in-coupling structure 1134 and the second light in-coupling structure 1151 can be reduced.

For example, the plastic frame 116 may also have a light shielding function, thereby preventing ambient light from being incident into the optical waveguide core layer 1131 via the gap between the core layer 1131 and the optical unit 120, or preventing ambient light from entering the sensor via the gap between the core layer 1131 and the sensor 131, thereby improving the detection accuracy of the fluid detection panel 100. For example, the plastic frame 116 provided between the first substrate 123 and the microfluidic substrate 110 is configured to allow the spacing between the first substrate 123 and the microfluidic substrate 110 to be uniform; for example, the plastic frame 116 provided between the sensor substrate 130 and the microfluidic substrate 110 is configured to allow the spacing between the sensor substrate 130 and the microfluidic substrate 110 to be uniform.

The specific implementations of the first light in-coupling structure 1134, the first light out-coupling structure 1135, the second light in-coupling structure 1151 and the second light out-coupling structure 1152 may be set according to actual application requirements, and no limitation will be given to the present embodiment of the present disclosure in this respect. For example, the first light in-coupling structure 1134, the first light out-coupling structure 1135, the second light in-coupling structure 1151 and the second light out-coupling structure 1152 may be implemented as gratings; for another example, the first light in-coupling structure 1134, the first light out-coupling structure 1135, the second light in-coupling structure 1151 and the second light out-coupling structure 1152 may also be implemented as reflection structures (for example, reflective film layers).

Figure 9:
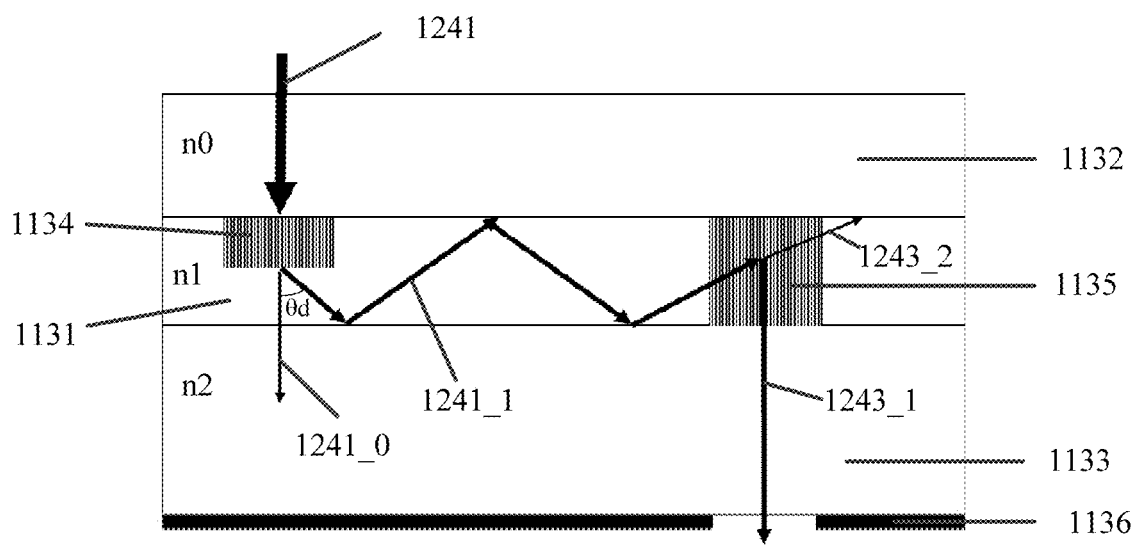
FIG. 9 is an exemplary arrangement of a first light in-coupling structure and a first light out-coupling structure.

FIG. 9 illustrates an exemplary arrangement of the first light in-coupling structure 1134 and the first light out-coupling structure 1135. The first light in-coupling structure 1134 and the first light out-coupling structure 1135 will be exemplarily described below with reference to FIG. 9 by taking the case where the first light in-coupling structure 1134 and the first light out-coupling structure 1135 are implemented as gratings as an example.

For example, a grating with a relatively small period (for example, the period of the grating may be less than half of the wavelength of the first light beam 1241 that is incident onto the grating) may be selected as the first light in-coupling structure 1134, and in this case, the first-order diffraction light 1241_1 of the grating is the strongest, and the zero-order diffraction light 1241_0 and the reflected light (not shown) are weak, thereby reducing the power consumption of the fluid detection panel 100. For example, the grating of the first light in-coupling structure 1134 does not generate diffraction light in other orders, thereby avoiding crosstalk caused by the diffraction light in other orders, and thus the power consumption of the fluid detection panel 100 is further reduced. For example, the diffraction angle of the first-order diffraction light 1241_1 of the grating of the first light in-coupling structure 1134 is configured such that the angle between the propagation angle of the first-order diffraction light 1241_1 and the normal direction of the first optical waveguide structure 113 is greater than the total reflection angle of the first optical waveguide structure 113, and such that the first-order diffraction light 1241_1 satisfies the total reflection condition of the first optical waveguide structure 113, and can propagate in the first optical waveguide structure 113 based on total reflection.

For example, the area of the grating (the area of the surface, which is perpendicular to the second direction D2, of the grating) may be determined based on the propagation angle of the first light beam 1241 outputted by the first filter substructure 1221. For example, the area of the grating allows most of the light (for example, all light) from the first light beam 1241 outputted by the first filter substructure 1221 to be incident onto the grating.

For example, the diffraction angle of the first-order diffraction light of the grating is related to a grating period, an equivalent refractive index of the grating, the wavelength of the first light beam 1241, and the angle of the first light beam 1241 that is incident onto the grating. Thus, on the basis that the wavelength of the first light beam 1241 and the angle of the first light beam 1241 that is incident onto the grating are determined (known), the diffraction angle of the first-order diffraction light of the grating can be adjusted by adjusting the grating period and the equivalent refractive index of the grating, such that the first-order diffraction light of the grating satisfies the total reflection condition of the first optical waveguide structure 113, and can propagate in the first optical waveguide structure 113 based on total reflection.

For example, the design method of the grating of the first light in-coupling structure 1134 will be exemplarily explained below with reference to FIG. 9.

As illustrated in FIG. 9, the refractive index of the first cladding layer 1132, the refractive index of the core layer 1131, and the refractive index of the second cladding layer 1133 are respectively n0, n1, and n2, and the angle between the first light beam 1241 and the normal direction of the grating is an incident angle $\theta i$, and the angle between the diffraction light of the grating (for example, the first-order diffraction light 1241_1) and the normal direction of the grating is a diffraction angle $\theta d$. For example, because the first light beam 1241 as illustrated in FIG. 9 is incident perpendicularly onto the grating, the incident angle $\theta i$ is 0 degree, and for the sake of clarity, the incident angle $\theta i$ is not illustrated in FIG. 9.

The diffraction light of the grating satisfies the following grating equation:

$$n \times (\sin \theta i \pm \sin \theta d) = \frac{m\lambda}{\Lambda},$$

wherein, n is an equivalent refractive index, m is a diffraction order, m=0, ±1, ±1, etc., (for example, m=1). For example, when the diffraction light is on the same side as the incident light, the above expression takes a positive sign, whereas when the diffraction light is on the different side from the incident light, the above expression takes a negative sign. For convenience of description, the above expression takes a positive sign, but the embodiment of the present disclosure is not limited thereto. For example, when the grating is stripe-shaped and the duty ratio of the grating (the ratio of the width of a grating line to the grating period) is 50%, the effective refractive index may be calculated according to the following expression, that is, n=(n1+n2)/2. For example, in the case where the grating line has other complicated shapes, the calculation may be performed based on the grating theory, and no further description will be given here.

From the above grating equation, the following expression may be derived:

$$\theta d = \arcsin\left(\frac{\lambda}{n \times \Lambda} - \sin \theta i\right).$$

In order to allow the grating of the first light in-coupling structure 1134 to couple the first light 124 that is incident on the first light in-coupling structure 1134 into the core layer 1131 of the first optical waveguide structure 113, the diffraction light of the grating (e.g., the first-order diffraction light 1241_1) is required to satisfy the total reflection condition of the first optical waveguide structure 113, that is, $\theta d \geq \theta 0$ and $\theta d \geq \theta 1$, here, $\theta 0$ is the critical angle of total reflection of the interface between the core layer 1131 and the first cladding layer 1132, $\theta 1$ is the critical angle of total reflection of the interface between the core layer 1131 and the second cladding layer 1133, and $\theta 0$ and $\theta 1$ satisfy the following expressions:

$$\theta 0 = \arcsin(n0/n1),$$

$$\theta 1 = \arcsin(n2/n1).$$

Thus, in order to allow the grating of the first light in-coupling structure 1134 to couple the first light 124 that is incident on the first light in-coupling structure 1134 into the core layer 1131 of the first optical waveguide structure 113, the following expressions is satisfied:

$$\theta d = \arcsin\left(\frac{\lambda}{n \times \Lambda} - \sin \theta i\right) \geq \arcsin(n0/n1),$$

$$\theta d = \arcsin\left(\frac{\lambda}{n \times \Lambda} - \sin \theta i\right) \geq \arcsin(n2/n1).$$

For example, in the case where n0 is less than n2, the above-mentioned two expressions can be combined into the following expression:

$$\theta d = \arcsin\left(\frac{\lambda}{n \times \Lambda} - \sin \theta i\right) \geq \arcsin(n2/n1) > \arcsin(n0/n1).$$

It should be noted that, in order to calculate the diffraction angle more accurately, the grating equation including n0 and n1 can be used. The specific calculation method may refer to the grating principle and the optical waveguide technology, and no further description will be given here. For example, in actual product design, the diffraction angle may also be accurately designed by professional optical simulation software, and no further description will be given here.

For example, the first light out-coupling structure 1135 may also include a grating. The requirement from the grating of the first light out-coupling structure 1135 for the diffraction angle is lower than the requirement from the grating of the first light in-coupling structure for the diffraction angle, so long as the grating of the first light out-coupling structure 1135 allows at least part of the light in the first optical waveguide structure 113 to leave the first light out-coupling structure 1135 via the grating. However, in order to increase the intensity of the light that is incident onto the first photosensitive area 132 of the sensor 131 and increase the sensitivity of the fluid detection panel, the grating with a relatively small period may be used, for example, the period of the grating may be less than half the wavelength of the light that is incident onto the grating, so as to increase the light intensity of the first-order diffraction light of the grating of the first light out-coupling structure 1135 to the greatest extent. In addition, the method of designing and optimizing the grating of the first light in-coupling structure may be referred to further optimize the grating of the first light out-coupling structure 135, and no further description will be given here.

For example, the second light in-coupling structure 1151 and the second light out-coupling structure 1152 may be respectively the same as the first light in-coupling structure 1134 and the first light out-coupling structure 1135, and thus, the second light in-coupling structure 1151 and the second light out-coupling structure 1152 may be respectively set with reference to the first light in-coupling structure 1134 and the first light out-coupling structure 1135, and no further description will be given here.

The sensor 131 of the fluid detection panel 100 will be exemplarily described below.

As illustrated in FIG. 3, the sensor 131 includes a first photosensitive area 132 and a second photosensitive area 133, and for example, the first photosensitive area 132 and the second photosensitive area 133 may be provided on the sensor substrate 130 (referring to FIG. 5). The first photosensitive area 132 is configured to detect light passing through the sample detection area 111, so as to output a detection signal; the second photosensitive area 133 is configured to detect the light passing through the comparison detection area 112. so as to output a comparison signal. For example, the detection signal and the comparison signal are used to acquire a calibrated detection signal.

As illustrated in FIG. 3, the first photosensitive area 132 and the second photosensitive area 133 are spaced apart from each other, and the spacing (the spacing in the third direction D3) between the first photosensitive area 132 and the second photosensitive area 133 matches with the spacing (the spacing in the third direction D3) between the light out-coupling structure 1135 and the second light out-coupling structures 1152. For example, when setting the spacing between the first photosensitive area 132 and the second photosensitive area 133, the spacing between the first light out-coupling structure 1135 and the second light out-coupling structure 1152 and the control accuracy of the first light out-coupling structure 1135 and the second light out-coupling structure 1152 over the light can be taken into account, and no further description will be given here regarding the specific setting of the spacing between the first photosensitive area 132 and the second photosensitive area 133.

For example, as illustrated in FIG. 5, the fluid detection panel 100 further includes a third light shielding layer 1136, and the third light shielding layer 1136 is provided at the side of the second cladding 1133 closer to the sensor 131; the third light shielding layer 1136 includes openings (a first opening 1136_1 and a second opening 1136_2), and the orthographic projection of the openings of the third light shielding layer 1136 on the sensor 131 is at least partially overlap the photosensitive areas of the sensor 31 (e.g., the first photosensitive area 132 and the second photosensitive area 133). For example, the third light shielding layer 1136 may include a first opening 1136_1 and a second opening 1136_2. As illustrated in FIG. 5, the orthographic projection of the first opening 1136_1 on the sensor 131 completely overlaps the first photosensitive area 132, and as illustrated in FIG. 7, the orthographic projection of the second opening on the sensor 131 completely overlap the second photosensitive area 133. For example, by providing the third light shielding layer 1136, the adverse interference of the light outputted by the first light out-coupling structure 1135 to the second photosensitive area 133 can be reduced, the interference of the light outputted by the second light out-coupling structure 1152 to the first photosensitive area 132 can be reduced, and thus the difficulty in designing and fabricating the first and second light out-coupling structures 1135 and 1152 can be lowered (for example, the requirement regarding the diffraction angle of the diffraction light of the grating is lowered).

In one example, as illustrated in FIG. 3, the first and second photosensitive areas 132 and 133 of the sensor 131 may be implemented as two separate devices (for example, a first sensor and a second sensor, which respectively output the first and second detection results). For example, the sensor 131 may be implemented as a sensor based on complementary metal oxide semiconductor (CMOS), a sensor based on charge coupled device (CCD), or a sensor based on PIN junction type photosensitive device.

In another example, the sensor 131 may include photosensitive pixels arranged in an array (i.e., a photosensitive pixel array, not shown), the first photosensitive area 132 includes at least one of the photosensitive pixels, and the second photosensitive area 133 includes at least one of the photosensitive pixels, and the position information (the row number and column number where the at least one of the photosensitive pixels is/are located in the photosensitive pixel array) of the photosensitive pixel included in the first photosensitive area 132 and the position information of the photosensitive pixel included in the second photosensitive area 133 may be predetermined before detection. In the detection operation, the detection signal and the comparison signal may be extracted from the overall detection signal outputted by the sensor 131 based on the predetermined position information, such that the calibrated detection signal can be acquired.

For example, each photosensitive pixel may include a photosensitive detector (for example, a photodiode, a phototransistor) and a switching transistor (for example, a switching transistor). The photodiode may convert an optical signal irradiated thereon into an electrical signal, and the switching transistor may be electrically connected to the photodiode to control whether or not the photodiode is in a state of collecting the optical signal and the time for collecting the optical signal. For example, the photodiode may be a PIN junction type photodiode or a phototransistor or the like, thereby increasing a response speed of the photodiode. For example, the photosensitive pixel may also include a sensing element based on complementary metal oxide semiconductor (CMOS) or a sensing element based on charge coupled device (CCD).

For example, the detection signal outputted by the first photosensitive area 132 and the comparison signal outputted by the second photosensitive area 133 may be provided for a signal processing device (not shown), and the signal processing device may acquire a calibrated detection signal based on the received detection signal and the comparison signal, and then acquires information of the liquid sample based on the calibrated detection signal through signal processing. For example, the difference between the detection signal and the comparison signal may be used as the calibrated detection signal.

For example, the signal processing device may be of various types or structures, for example, may be implemented by hardware, software, firmware, or any combination. For example, in one example, the signal processing device may include a processor and a memory storing therein an executable program, and the executable program, when executed by the processor, can perform signal processing on an electrical signal received by the signal processing device, and can output information related to the liquid sample (for example, the substance contained in the liquid sample or/and the concentration of the substance contained in the liquid sample). For example, the signal processing device may be a component of the fluid detection panel 100; for another example, the signal processing device may be provided by the user voluntarily as desired. For example, in the case where the signal processing device is provided by the user voluntarily, the signal processing device may be implemented as a handheld electronic device (for example, a mobile phone) or a computer. For example, the fluid detection panel 100 and the signal processing device may be connected in a wired or wireless manner. For example, according to actual application requirements, the signal processing device includes an analysis database (for example, information regarding correspondences between substance types and absorption wavelengths). The signal processing device may compare the received electrical signal with reference data pre-stored in the database (for example, data benchmarking), thereby enabling the signal processing device to output an analysis result (for example, the substance contained in the liquid sample or/and the concentration of the substance contained in the liquid sample).

It should be noted that the first and second cladding layers 1132 and 1133 of the first optical waveguide structure 113 are not limited to being formed of air. According to actual application requirements, the first optical waveguide structure 113 may also be formed of other applicable media as long as the refractive indexes of the first and second cladding layers 1132 and 1133 are both less than that of the core layer 1131. Another fluid detection panel 100 in which the first and second cladding layers 1132 and 1133 are formed of the media other than air will be exemplarily explained in conjunction with FIG. 10.

Figure 10:
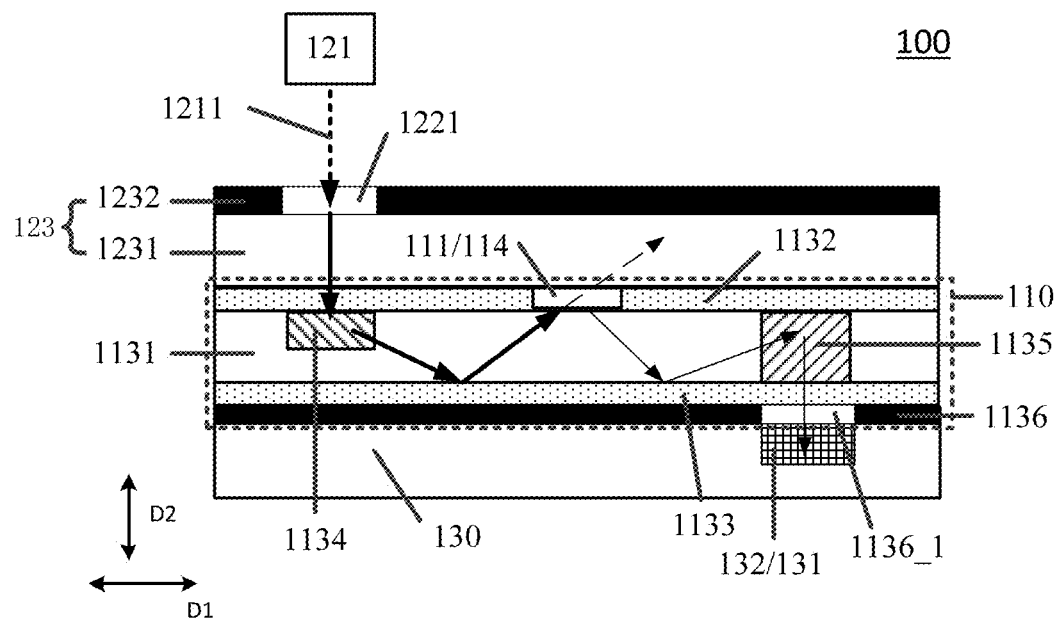
FIG. 10 is a schematic sectional view of another fluid detection panel provided by some embodiments of the present disclosure.
Figure 11:
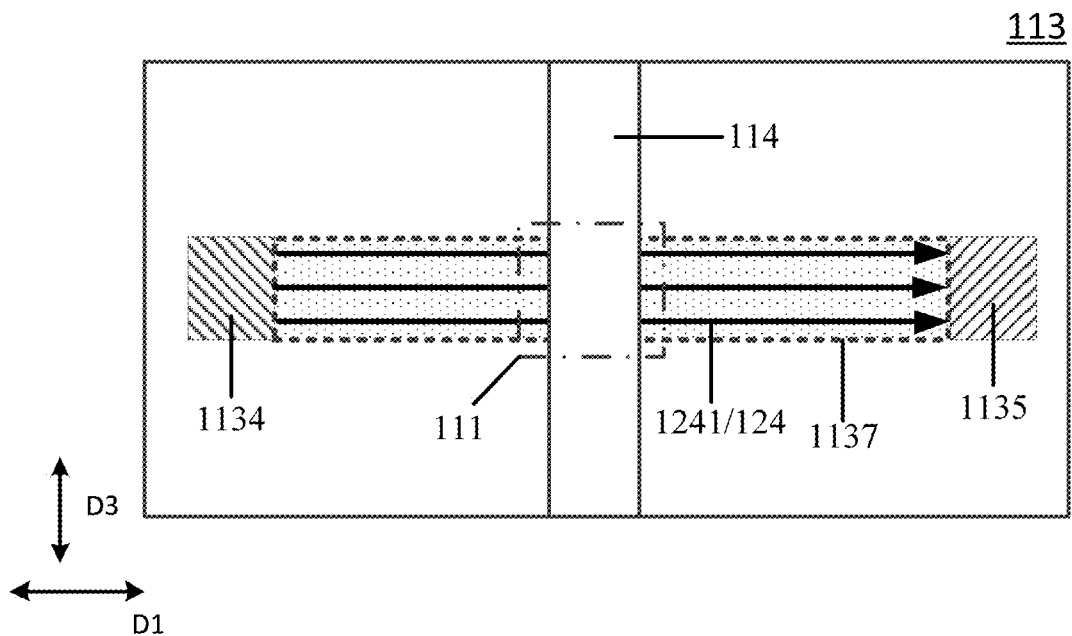
FIG. 11 is a schematic plan view of a microfluidic substrate of the fluid detection panel as illustrated in FIG. 10.

FIG. 10 is a schematic sectional view of another fluid detection panel 100 provided by some embodiments of the present disclosure, and FIG. 11 is a schematic plan view of the microfluidics substrate 110 of the fluid detection panel 100 as illustrated in FIG. 10.

The fluid detection panel 100 as illustrated in FIG. 10 is similar to the fluid detection panel 100 as illustrated in FIG. 5, and thus, only the differences will be explained herein, without repeating the similarities. The following three differences exist between the microfluidic substrate as illustrated in FIG. 10 and the microfluidic substrate 110 as illustrated in FIG. 5. First, the first cladding layer 1132 of the microfluidic substrate 110 as illustrated in FIGS. 10 and 11 is formed of a medium other than air; secondly, the second cladding layer 1133 of the microfluidic substrate 110 as illustrated in FIG. 10 is formed of a medium other than air; thirdly, the flow passage 114 of the microfluidic substrate 110 as illustrated in FIG. 10 is provided in the first cladding layer 1132.

As illustrated in FIGS. 10 and 11, the microfluidic substrate 110 includes a flow passage 114 which is provided in the first cladding layer 1132 and exposes the core layer 1131. For example, the flow passage 114 at least partially extends into the core layer 1131 in the height direction (the second direction), such that the liquid sample located in the flow passage 114 can be in direct contact with the core layer 1131. The extension direction of the flow passage 114 is intersected with (for example, perpendicular to) the extension direction of the propagation passage of the first light 124 in the first optical waveguide structure 113, and the sample detection area 111 is the area of the flow passage 114 intersecting with the propagation passage (the orthographic projection of the propagation passage on the first cladding layer). In this case, when the liquid sample arrives at the sample detection area 111, the liquid sample changes the total reflection condition of the area of the core layer 1131 in contact with the liquid sample, which therefore allows at least part of the first light 124 (the first light beam 1241) propagated in the core layer 1131 to leave the core layer 1131 and first optical waveguide structure 113, reduces the intensity of the light that is incident onto the sensor 131 (the first photosensitive area 132 of the sensor 131) via the first light out-coupling structure 1135, and correspondingly reduces the intensity of the detection signal outputted by the sensor 131, such that the information of the liquid sample (for example, the substance contained in the liquid sample or/and the concentration of the substance contained in the liquid sample) can be determined at least based on the intensity of the detection signal. For example, the intensity of the detection signal is negatively related to the refractive index of the liquid sample (and/or the concentration of the liquid sample).

For example, when the liquid sample is detected using the fluid detection panel 100 as illustrated in FIG. 10, a liquid sample with a refractive index greater than that of the core layer 1131 may be used, and in this case, the liquid sample may change the total reflection condition of the first optical waveguide structure 131, and allow at least part of the first light 124 (the first beam 1241) propagated in the core layer 1131 to leave the core layer 1131 and the first optical waveguide structure 113, and thus the first beam 1241 leaving via the liquid sample fails to be incident on the first photosensitive area 132 of the sensor 131, so the intensity of the detection signal outputted by the first photosensitive area 132 of the sensor 131 is lowered. For example, for the fluid detection panel 100 as illustrated in FIG. 10, the refractive index of the core layer 1131 may be as small as possible, under the premise that the first light 124 can be propagated in the core layer 1131 based on total reflection, thereby widen the detection ability and range of applications of the fluid detection panel as illustrated in FIG. 10.

For example, for the microfluidic substrate 110 as illustrated in FIGS. 10 and 11, the first cladding layer 1132 may be made of a material with a higher transmissivity for the first light 124, such that more of the first light 124 outputted by the filter structure 122 may pass through the first cladding layer 1132 and enter the core layer 1131, and thus the power consumption of the fluid detection panel 100 can be reduced or the detection accuracy of the fluid detection panel 100 can be improved, this is because, for example, the intensity of the detection signal provided by the sensor 131 is increased while the noise is kept unchanged. For example, according to actual application requirements, the first cladding layer 1132 may also be made of an opaque material (or a light shielding material), and the area of the first cladding layer 1132 corresponding to the filter structure 122 has an opening, such that the first light 124 outputted by the filter structure 122 may enter the core layer 1131 via the opening of the first cladding layer 1132; and in this case, the first light shielding layer 1232 may not be provided.

For example, for the microfluidic substrate 110 illustrated in FIGS. 10 and 11, the second cladding layer 1133 may be made of a material with a higher transmissivity for the first light 124, such that more of the first light 124 leaving the core layer 1131 may pass through the second cladding layer 1133 and be incident onto the sensor 131, and thus the power consumption of the fluid detection panel 100 can be reduced or the detection accuracy of the fluid detection panel 100 can be improved, this is because, for example, the intensity of the detection signal provided by the sensor 131 is increased while the noise is kept unchanged. For example, according to actual application requirements, the second cladding layer 1133 may be made of an opaque material (or a light shielding material), and the region, which is corresponding to the sensing area (the first and second photosensitive areas 132 and 133) of the sensor 131, of the second cladding layer 1133 has an opening, such that the first light 124 leaving the core layer 1131 may pass through the opening of the second cladding layer 1133 and be incident onto the sensor 131; and in this case, the third light shielding layer 1136 may not be provided.

For example, for the microfluidic substrate 110 illustrated in FIGS. 10 and 11, the first cladding layer 1132 may be made of an inorganic material or an organic material, such as glass, silicon dioxide ($SiO_2$), a resin, or a polymer. For example, the second cladding layer 1133 may also be made of an inorganic material or an organic material. For example, when a polymer is selected, PDMS (polydimethylsiloxane) or PMMA (polymethyl methacrylate) may be used. For example, the first cladding layer 1132 may be formed on the core layer 1131 by deposition, coating, or other methods. For example, the thickness of the first cladding layer 1132 may be determined by the specific product design or process condition. For example, the thickness of the first cladding layer 1132 may be on the micron order (for example, 1 to 10 microns). For example, the flow passage 114 may be formed in the first cladding layer 1132 by photolithography, etching, imprinting, or other suitable methods. For example, the width (the width in the first direction D1) of the flow passage 114 and the height (the height in the second direction) of the flow passage 114 may be set according to the actual application requirements. For example, the width and height of the flow passage 114 may be on the order of nanometers (for example, 1-100 nanometers).

For example, for the microfluidic substrate 110 illustrated in FIGS. 10 and 11, the second cladding layer 1133 may be made of silicon dioxide ($SiO_2$), a photoresist, or a polymer, and the second cladding layer 1133 is formed on the core layer 1131 of the first optical waveguide structure 113, for example, by deposition, coating, or other methods. For example, the thickness of the second cladding layer 1133 may be determined by the specific product design or process conditions. For example, the second cladding layer 1133 may have a thickness of about 1 micron.

For example, in the case where the first optical waveguide structure 113 is formed of a medium other than air, as illustrated in FIG. 10, the first optical waveguide structure may be attached to the optical unit 120 by attaching the first cladding layer 1132 to the optical unit 120, and the first optical waveguide structure may be attached to the sensor 131 by attaching the second cladding layer 1133 to the sensor 131. As illustrated in FIG. 10, the attaching of the first optical waveguide structure 113 and the optical unit 120 and the attaching of the first optical waveguide structure and the sensor 131 may be implemented in a manner of surface attaching. For example, an optically clear adhesive (not shown) may be used to realize the attaching of the first optical waveguide structure 113 and the optical unit 120 and the attaching of the first optical waveguide structure 113 and the sensor 131. For another example, the attaching of the first optical waveguide structure 113 and the optical unit 120 and the attaching of the first optical waveguide structure and the sensor 131 may also be implemented in a manner of frame attaching as illustrated in FIG. 5, and no further description will be given here.

It should be noted that the flow passage 114 is not limited to be provided in the first cladding layer 1132. According to the actual application requirements, the flow passage 114 may also be provided in the second cladding layer 1133 and exposes the core layer 1131. In this case, the specific implementation of the microfluidic substrate 110 may refer to the examples as illustrated in FIGS. 10 and 11, and no further description will be given here.

The specific implementation and the filtering principle of the filter structure 122 will be exemplarily explained below in conjunction of FIGS. 12A to 12D.

For example, the filter structure 122 illustrated in FIG. 3 may be implemented as a Fabry-Perot (F-P)-cavity microcavity resonant type filter structure. An implementation of the F-P-cavity microcavity resonant type filter structure (that is, a filter structure that includes a F-P-cavity and realizes filtering function based on microcavity resonant) will be exemplarily explained below in conjunction with FIGS. 12A-12D.

Figure 12A:
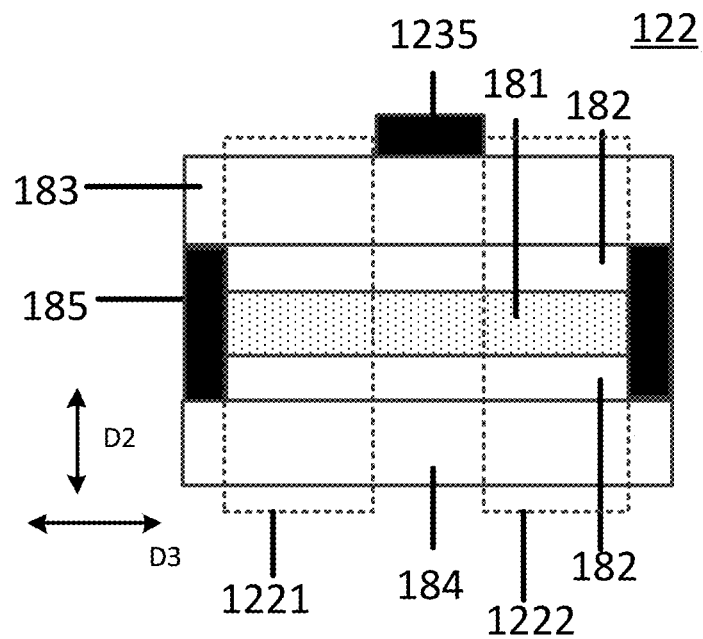
FIG. 12A is a schematic sectional view of a filter structure provided by some embodiments of the present disclosure.
Figure 12B:
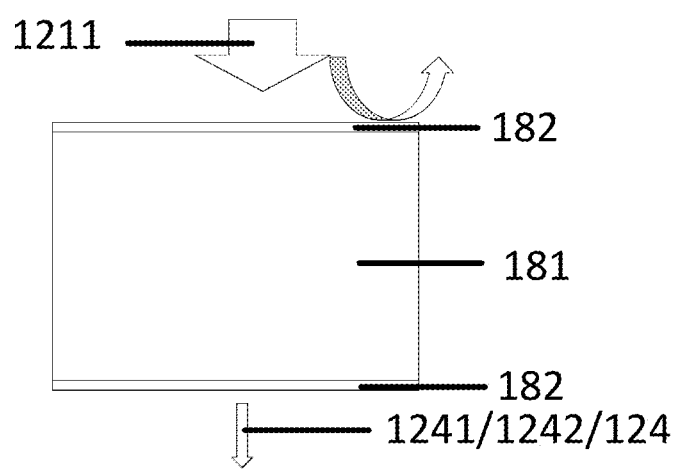
FIG. 12B is a diagram illustrating working principle of the filter structure as illustrated in FIG. 12A.

FIG. 12A is a schematic sectional view of a filter structure 122 provided by some embodiments of the present disclosure. For the sake of clarity, the filter structure 122 as illustrated in FIG. 12A also illustrates the second light shielding layer 1235. The area of the filter structure 122 on the left side of the second light shielding layer 1235 is the first filter substructure 1221, and the area of the filter structure 122 on the right side of the second light shielding layer 1235 is the second filter substructure 1222. FIG. 12B is a diagram illustrating a working principle diagram of the filter structure 122 as illustrated in FIG. 12A.

As illustrated in FIGS. 12A and 12B, in some embodiments of the present disclosure, the filter structure 122 includes a liquid crystal layer 181 and a liquid crystal control electrode 182, i.e., the filter structure 122 may be implemented as a liquid crystal filter structure. For example, as illustrated in FIG. 12B, when the second light 1211 emitted by the light source 121 is incident onto the filter structure 122, the filter structure 122 allows the first light 124 in the second light 1211 to pass through the filter structure 122 and does not allow the light in the second light 1211 other than the first light 124 to pass through the filter structure 122.

For example, with a liquid crystal filter structure, the light emitted by the light source 121 may be filtered without using a large-sized free-space optical element (for example, a grating and a lens), thereby reducing the size of the fluid detection panel 100. For example, the fluid detection panel 100 provided by some embodiments of the present disclosure may be implemented as a miniature spectrometer. For example, the filter structure 122 adopts a liquid crystal layer and a liquid crystal control electrode, that can be manufactured with mature techniques and low costs, to filter the light emitted by the light source 121, so the filter structure 122 has a low cost and is suitable for mass production, thereby enabling the fluid detection panel 100 as illustrated in FIGS. 12A and 12B to have low costs and to be suitable for mass production.

The liquid crystal control electrode 182 is configured to receive a driving voltage signal to control a peak transmission wavelength of the filter structure 122. For example, the filter structure 122 further includes a control device (not illustrated in FIG. 12A), and the control device is configured to apply the driving voltage signal to the liquid crystal control electrode 182, such that the filter structure 122 may control the peak transmission wavelength of the filter structure 122 based on the driving voltage signal provided by the control device. The side of the filter structure 122 that is closer to the light source 121 is the light that is incident side of the filter structure 122, and the side of the filter structure 122 that is away from the light source 121 is the light outgoing side of the filter structure 122.

As illustrated in FIG. 12A, the liquid crystal control electrodes 182 are provided on both sides of the liquid crystal layer 181. For example, the liquid crystal material may be a blue phase liquid crystal material or a liquid crystal material suitable for any of the following modes: twisted nematic (TN), vertical alignment, in-plane switching (IPS), advanced super-dimensional field conversion mode (ADS) and fringe field switching (FFS).

In the case where the liquid crystal control electrode 182 receives the driving voltage signal, the liquid crystal control electrode 182 forms an electric field with a predetermined intensity in the liquid crystal layer 181, and the electric field drives the liquid crystal molecules in the liquid crystal layer 181 to perform corresponding rotation based on the driving voltage signal. Therefore, the refractive index of the liquid crystal layer 181 is correspondingly modulated, such that the refractive index of the liquid crystal layer 181 may change with a change in the driving voltage signal, i.e., the refractive index of the liquid crystal layer 181 is adjustable. For example, the adjustable range of the refractive index of the liquid crystal layer 181 may be relatively large (for example, the difference between the maximum refractive index and the minimum refractive index of the liquid crystal layer 181 is greater than 0.29). For example, the peak wavelength and the spectral width (full width at half maximum, FWHM) of the light after filtering operation of the filter structure 122 are related to the thickness of the liquid crystal layer 181. For example, the liquid crystal layer 181 has a thickness of about 3 micrometers, but embodiments of the present disclosure are not limited thereto. For example, when designing the thickness of the liquid crystal layer 181, the electrical design, drive design, or the like of the filter structure 122 may be taken into consideration, and no further description will be given here.

For example, the liquid crystal control electrode 182 may be made of a metal material, such as silver, aluminum, or molybdenum. For example, the thickness of the liquid crystal control electrode 182 (the thickness in the direction perpendicular to the panel surface of the fluid detection panel 100, that is, the thickness in the second direction D2) may be between several micrometers and several tens of micrometers. The liquid crystal control electrode 182 may be configured for not only driving the liquid crystal molecules of the liquid crystal layer 181 to rotate, but also for forming a Fabry-Perot (FP) cavity (e.g., a microcavity). The light entering the F-P cavity outputs filtered light after the light entering the F-P cavity being oscillated back and forth a plurality of times in the F-P cavity, and the filtered light has a spectral width less than that of the light emitted by the light source 121. In the case where the voltage applied to the liquid crystal layer 181 via the liquid crystal control electrode 182 is changed, the angle of rotation of the liquid crystal molecules in the liquid crystal layer 181 is changed, and thus, the refractive index of the liquid crystal layer 181 filled in the F-P cavity is changed, and the peak wavelength of the filtered light is changed. For example, by controlling (for example, accurately controlling) the driving voltage signal applied to the liquid crystal control electrode 182, the peak wavelength of the filtered light output by the filter structure 122 can be adjusted (for example, continuously tuned). For example, the filter structure 122 as illustrated in FIG. 12A can provide light with a peak wavelength being a particular wavelength (for example, the light that is difficult to acquire using a conventional filter structure). For example, the filter structure 122 provided by some embodiments of the present disclosure may provide the light with an electrically adjustable narrow spectrally width. When the light with the electrically adjustable narrow spectrally width is applied in a sample measurement, the detection accuracy of the fluid detection panel 100 can be improved and the number of the types of detectable samples can be increased. In another example, the liquid crystal control electrode 182 may also be implemented by a lamination of a metal layer (for example, a silver layer) and a thin film of transparent oxide layer. For example, the transparent oxide layer is closer to the liquid crystal layer 181 than the metal layer.

For example, as illustrated in FIG. 12A, the filter structure 122 further includes a first optical substrate 183 and a second optical substrate 184 disposed opposite to each other, and the second optical substrate 184 is closer to the sensor 131 than the first optical substrate 183. As illustrated in FIG. 12A, the liquid crystal layer 181 is sandwiched between the first and second optical substrates 183 and 184; the liquid crystal control electrode 182 is provided between the first and second optical substrates 183 and 184; and part of the liquid crystal control electrode 182 is provided on the first optical substrate 183, and another part of the liquid crystal control electrode 182 is provided on the second optical substrate 184.

For example, the filter structure 122 may be obtained by the following method. First, the liquid crystal control electrodes 182 may be formed on the first and second optical substrates 183 and 184 respectively, the liquid crystal control electrodes 182 may have a predetermined pattern (for example, the liquid crystal control electrodes 182 may be a planar electrode or a slit electrode); and then, the first and second optical substrates 183 and 184 formed with the liquid crystal control electrode 182 may be disposed opposite to each other and can form a liquid crystal cell through a sealant 185; afterwards, in the process of forming the liquid crystal cell or after the liquid crystal cell is formed, a liquid crystal material may be injected between the first and second optical substrates 183 and 184, such that the liquid crystal material that is injected between the liquid crystal control electrode 182 on the first optical substrate 183 and the liquid crystal control electrode 182 on the second optical substrate 184 form the liquid crystal layer 181.

For example, the first and second optical substrates 183 and 184 has a higher transmissivity (for example, greater than 90%) for the light emitted by the light source 121. For example, the first and second optical substrates 183 and 184 may be a glass substrate, a quartz substrate, a plastic substrate (for example, a polyethylene terephthalate (PET) substrate), or a substrate made of other suitable materials. For example, the first and second optical substrates 183 and 184 may adopt a substrate suitable for applying in a liquid crystal display device or an organic light emitting diode display device, or adopt a substrate made of customized optical glass, a resin material, or the like. For example, the thicknesses of the first and second optical substrates 183 and 184 may be determined based on specific product designs or process conditions, and the thicknesses of the first and second optical substrates 183 and 184 are, for example, 0.1 millimeters to 2 millimeters. For example, the surfaces, which is perpendicular to the direction (that is, the second direction D2) perpendicular to the first optical substrate 183, of the first and second optical substrates 183 and 184 may have good flatness and parallelism. For example, the first and second optical substrates 183 and 184 may be optical glass with a refractive index of about 1.46.

Figure 12C:
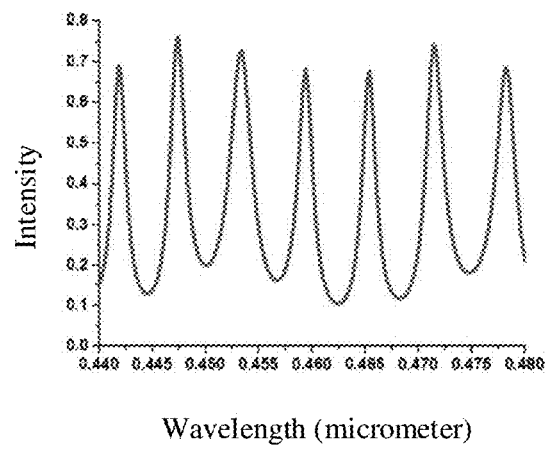
FIG. 12C is a diagram illustrating spectral distribution of the first light outputted by the filter structure as illustrated in FIGS. 12A and 12B.

In one example, the second light 1211 that is incident onto the filter structure 122 is the light emitted by the blue light emitting diode (the spectrum is in a waveband of 440-480 nm), and the spacing between the liquid crystal control electrodes 182 (i.e., the thickness of the F-P cavity) is about 10 micrometers. The liquid crystal control electrode 182 is a silver electrode, and the thickness of the silver electrode (the thickness in the second direction D2) is 20 nm, and the refractive index of the liquid crystal layer 181 is 1.70. Based on the above-mentioned structural parameters, the filter structure 122 in this example is simulated using a software (FDTD Solution) for performing calculation of a time-domain finite difference method, with the simulation result being illustrated in FIG. 12C. FIG. 12C is diagram illustrating spectral distribution of the first light 124 outputted by the filter structure 122 as illustrated in FIGS. 12A and 12B. As illustrated in FIG. 12C, the full width at half maximum of each spectral peak of the first light 124 is about 1-2 nanometers. Therefore, the filter structure 122 as illustrated in FIGS. 12A and 12B may effectively filter the light emitted by the light source 121, and thus the accuracy of the detection result outputted by the fluid detection panel 100 can be improved. For example, in the case where the light outputted from the F-P-cavity microcavity resonant type filter structure has a plurality of spectral peaks while the liquid crystal detection utilizes only one of the plurality of spectral peaks, the filter structure 122 may further include a light filter (for example, a band pass filter) superimposed with the F-P-cavity microcavity resonant type filter structure, and no further description will be given here.

Figure 12D:
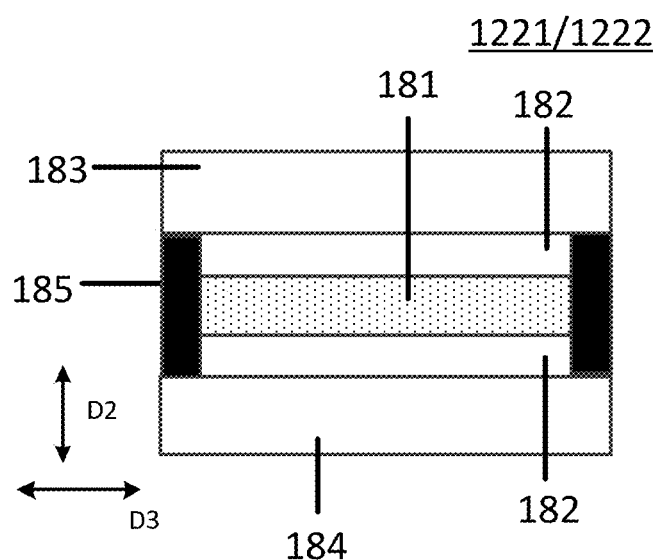
FIG. 12D is a schematic sectional view of another first and second filter structures provided by some embodiments of the present disclosure.

FIG. 12D is a schematic sectional view of another first and second filter structures 1221 and 1222 provided by some embodiments of the present disclosure. The first filter substructure 1221 illustrated in FIG. 12D is similar to the filter structure 122 illustrated in FIG. 12A, and the second filter substructure 1222 illustrated in FIG. 12D is similar to the filter structure 122 illustrated in FIG. 12A.

It should be noted that, for the F-P-cavity microcavity resonant type filter structure, it is not limited to the case that a liquid crystal material is provided in the F-P cavity. According to actual application requirements, a light transmissive dielectric film (for example, a SiNx thin film) may be provided in the F-P cavity. For example, the light transmissive dielectric film has a higher transmissivity for the second light 1211 (for example, when the second light passes through the light transmissive dielectric film once, the loss of the second light 1211 caused by the light transmissive dielectric film is less than 0.1%). For example, the thickness (the thickness in the second direction D2) of the light transmissive dielectric film may be set according to actual application requirements, and no further description will be given here.

For example, the filter structure as illustrated in FIG. 3 may also be implemented as a holographic transmissive type filter structure. For example, the holographic transmissive type filter structure includes a holographic grating. For example, for the holographic grating with one structural parameter, the first light outputted by the holographic grating only has one spectral peak and one diffraction order (in addition to the zero-order diffraction light, the zero-order diffraction light is absorbed by the light shielding layer), thereby simplifying the design difficulty of the fluid detection panel.

The structure and working principle of a microfluidic substrate will be exemplarily described below in conjunction with FIGS. 13A and 13B, but the microfluidic substrate of the fluid detection panel adopted in the embodiments of the present disclosure is not limited to the microfluidic substrate as illustrated in FIGS. 13A and 13B.

FIG. 13A is a schematic plan view of a driving electrode array of a microfluidic substrate 800 provided by some embodiments of the present disclosure. The microfluidic substrate is a microfluidic substrate based on dielectric wetting effect. As illustrated in FIG. 13A, the microfluidic substrate 800 includes a plurality of driving electrodes 801, the plurality of driving electrodes 801 are arranged in an electrode array with a plurality of rows and columns, and the plurality of driving electrodes 801 are insulated with each other. For example, each of the driving electrodes 801 belongs to one driver unit. The electrode array can drive liquid droplets including the sample to move in the case where the driving signal is applied (e.g., to move along a row direction A1 of the electrode array), and the electrode array can also perform other operations, such as breaking up, aggregating the liquid droplets, etc.

As illustrated in FIG. 13A, the microfluidic substrate 800 further includes a plurality of first signal lines G1-Gm and a plurality of second signal lines D1-Dn. The plurality of first signal lines G1-Gm are connected to, for example, a gate driving circuit, and the plurality of second signal lines D1-Dn are connected to a driving voltage applying circuit. For example, the gate driving circuit and the driving voltage applying circuit may be directly formed on the microfluidic substrate 800, or the gate driving circuit may be separately formed as a gate driving chip, and then the gate driving chip is bonded onto the microfluidic substrate 800.

FIG. 13B is a schematic sectional view of the microfluidic substrate 800 illustrated in FIG. 13A along a L-L' line. For convenience of description, FIG. 13B also illustrates a liquid droplet 880 including the sample. As illustrated in FIGS. 13A and 13B, the microfluidic substrate 800 includes the plurality of driving electrodes 801, each of which includes an opening area 8011. The portions of the driving electrodes 801 on opposite sides of the opening area 8011 have different areas. The driving electrode 801 is divided by the opening area 8011 into a first portion 801a and a second portion 801b.

As illustrated in FIG. 13B, the microfluidic substrate 800 further includes a switching element (for example, a thin film transistor). The switching element includes a gate electrode 803, a gate insulating layer 804, an active layer 805, a first electrode 806, a second electrode 807, and an insulating layer 808. The first portion 801a of the driving electrode 801 is in electrical contact with the second electrode 807 via a through hole in the insulating layer 808.

As illustrated in FIG. 13B, the microfluidic substrate 800 may further include a base substrate 102, an insulating layer 809 and a hydrophobic layer 810. The hydrophobic layer 810 is formed on the surface, which is configured for carrying and supporting the liquid droplets 880, of the microfluidic substrate 800. Through providing the hydrophobic layer 810, the liquid droplets 880 can be prevented from penetrating into the microfluidic substrate 800, the loss of liquid droplets 880 is reduced, and the liquid droplets 880 are facilitated to move on the microfluidic substrate 800. The insulating layer 809 is configured such that the driving electrode 801 is electrically insulated from the liquid droplets 880. The insulating layer 809 may also function as a planarization layer, such that the microfluidic substrate 800 has a flat surface. In some exemplary embodiments, the hydrophobic layer 810 may be made of Teflon, the insulating layer 809 may be made of an inorganic insulating material or an organic insulating material (for example, a resin), but the embodiment of the present disclosure is not limited thereto.

The principle of driving liquid to move by the microfluidic substrate 800 will be exemplarily described below in conjunction with FIG. 13B. In the first time period, the second electrode of the switching element provides a driving signal for the driving electrode 801. Because the voltage that is applied to the driving electrode 801 is, for example, a positive voltage and positive charges are on the driving electrode 801, corresponding negative charge is coupled (generated) at the lower portion of the liquid droplets 880 located above the driving electrode 801 (referring to FIG. 13B). In the second time period (the second time period is later than the first time period), when the control electrode of the switching element that is electrically connected to the driving electrode 801' receives a turned-on signal, the second electrode of the switching element provides a driving signal for the driving electrode 801' while no driving signal is applied to the driving electrode 801 (or the driving electrode 801 is grounded or is discharged through being applied with a negative driving signal). In the second time period, because positive charges are on the driving electrode 801', and negative charges are on the lower portion of the liquid droplets 880, the liquid droplets 880 move towards the driving electrode 801' along the direction indicated by the arrow A under the attractive force between the positive and negative charges.

Figure 14:
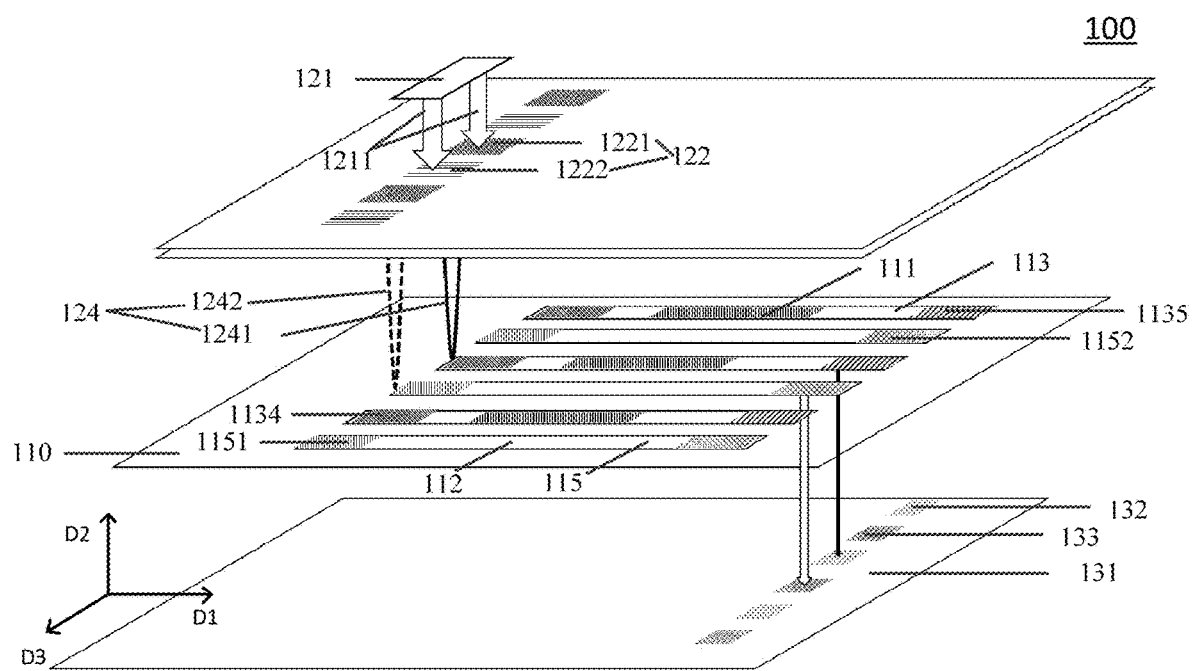
FIG. 14 is a schematic diagram of a further fluid detection panel provided by some embodiments of the present disclosure.

FIG. 14 is a schematic diagram of a further fluid detection panel 100 provided by some embodiments of the present disclosure. As illustrated in FIG. 14, the fluid detection panel 100 includes a microfluidic substrate 110, an optical unit and a sensor 131. The optical unit includes a light source 121 and a filter structure 122. As illustrated in FIG. 14, the fluid detection panel 100 includes (may be divided into) a plurality of detection units, each of which has the same or similar structure as or to the fluid detection panel 100 as illustrated in FIG. 3, and may be configured for detecting one of liquid samples. Therefore, the fluid detection panel 100 as illustrated in FIG. 14 may be configured for simultaneously detecting a plurality of liquid samples, thereby improving the detection efficiency and/or the detection ability.

As illustrated in FIG. 14, each of the detection units includes first and second optical waveguide structures 113 and 115 of the microfluidic substrate 110, first and second filter substructures 1221 and 1222 and at least part of the light source 121 of the optical unit, and first and second photosensitive areas 132 and 133 of the sensor 131. The first optical waveguide structure 113 includes a sample detection area 111, a first light in-coupling structure 1134 and a first light out-coupling structure 1135, and the second optical waveguide structure 115 includes a comparison detection area 112, a second light in-coupling structure 1151 and a second light out-coupling structure 1152; the first filter substructure 1221 and the second filter substructure 222 have the same filter parameters. For example, the first photosensitive area 132 is not superimposed (overlapped) with the sample detection region 111 in the second direction D2, and the second photosensitive area 133 is not superimposed with the comparison detection area 112 in the second direction D2.

For example, the orthographic projection of the sample detection area 111 on the sensor is located between the orthographic projection of the filter structure (for example, the first filter substructure 1221) on the sensor and the photosensitive area (for example, the first photosensitive area 132); the orthographic projection of the comparison detection area 112 on the sensor is located between the orthographic projection of the filter structure (e.g., the second filter substructure 1222) on the sensor and the photosensitive area (e.g., the second photosensitive area 133).

As illustrated in FIG. 14, for each detection unit, the light emitted by the light source 121 is incident onto the first filter substructure 1221 and the second filter substructure 222, so the second light 1211 that is incident onto the first filter substructure 1221 and the second filter substructure 222 have the same parameters. The first light beam 1241 of the first light 124 outputted by the first filter substructure 1221 is incident on the first light in-coupling structure 1134, enters the first optical waveguide structure 113 and propagates in the first optical waveguide structure 113 based on total reflection; after reacting with the liquid sample in the flow passage 114, the first light beam 1241 leaves the first optical waveguide structure 113 via the first light out-coupling structure 1135 and is incident onto the first photosensitive area 132 of the detection unit 132, and the first photosensitive area 132 provides a detection signal based on the collected light. The second light beam 1242 in the first light 124 outputted by the second filter substructure 1222 is incident on the second light in-coupling structure 1151, enters the second optical waveguide structure 115, and propagates in the second optical waveguide structure 115 based on total reflection; and then, the second light beam 1242 leaves the second optical waveguide structure 115 via the second light out-coupling structure 1152 and is incident onto the second photosensitive area 133 in the detection unit, the second photosensitive area 133 provides a comparison signal based on the collected light, such that the information related to the liquid sample can be acquired based on the detection signal and the comparison signal.

In one example, the plurality of detection units have the same detection capability (for example, different detection units are all configured for detecting whether or not the liquid samples contain a first substance to be detected), and the plurality of detection units have the same structure, for example. In this example, the first filter substructures 1221 of the plurality of detection units have the same first filtering parameters, and the second filter substructures 1222 of the plurality of detection units have the same second filtering parameters. Therefore, the first light 124 which is outputted by the first filter structures of different detection units and incident on different sample detection areas 111 have the same parameter (spectral parameter and light intensity parameter), and thus, the plurality of detection units have the same detection capability.

In this example, the second light 1211 emitted by the light source 121 can be incident onto the first filter substructure 1221 and the second filter substructure 222 of the plurality of detection units, and the second light 1211 that is incident onto the first filter substructure 1221 and the second filter substructure 222 of the plurality of detection units have the same parameter (spectral parameter and light intensity parameter). As illustrated in FIG. 14, the plurality of detection units may be arranged in parallel in the third direction D3. In this case, the plurality of first optical waveguide structures 113 and the plurality of second optical waveguide structures 115 of the microfluidic substrate 110 are arranged alternately in the third direction D3, the plurality of first filter substructures 1221 and the plurality of second filter substructures 1222 of the optical unit are arranged alternately in the third direction D3, and the first photosensitive areas 132 and the second photosensitive areas 133 of the sensor 131 are arranged alternately, but the embodiments of the present disclosure are not limited thereto. For example, the fluid detection panel 100 may also include a sample detection region and a comparison detection region arranged in parallel in the third direction D3, the plurality of first optical waveguide structures 113, the plurality of first filter substructures 1221 and the plurality of first photosensitive areas 132 of the plurality of detection units are sequentially arranged in the sample detection region along the third direction D3, and the plurality of second optical waveguide structures 115, a plurality of second filter substructures 1222 and a plurality of the second photosensitive areas 133 of the plurality of detection units are sequentially arranged in the comparison detection area 112 along the third direction D3.

In another example, the plurality of detection units have different detection capabilities, and the detection capability can be increased and range of applications of the fluid detection panel 100 can be widen in this case. For example, a first detection unit may be configured for detecting whether or not the liquid sample in the first detection unit has a first substance to be detected (for example, methanol); a second detection unit may be configured for detecting whether or not the liquid sample in the second detection unit has a second substance to be detected (for example, ethanol), and the first substance to be detected is different from the second substance to be detected. In this another example, the plurality of first filter substructures 1221 of the plurality of detection units have different first filtering parameters, and the plurality of second filter substructures 1222 of the plurality of detection units have different second filtering parameters. Therefore, the first light 124 that is outputted by the first filter structures of different detection units and incident on the different sample detection areas 111 have different parameters (spectral parameters and light intensity parameters), and thus, the plurality of detection units have different detection capabilities.

In this another example, the second light 1211 emitted by the light source 121 (for example, the color of the second light 1211 is white) may be incident onto the first filter substructures 1221 and the second filter substructures 222 of the plurality of detection units, and the second light 1211 that is incident onto the first filter substructures 1221 and the second filter substructures 222 of the plurality of detection units have the same parameters (spectral parameters and light intensity parameters), but embodiments of the present disclosure are not limited thereto.

For example, the light source 121 may also include a plurality of light source substructures, and the second light 1211 emitted from the plurality of light source substructures have different parameters (for example, having different peak wavelengths). In this case, the second light 1211 that is incident onto the first filter substructures 1221 and the second filter substructures 222 of the plurality of detection units have different parameters (spectral parameters and light intensity parameters). In this case, the light source substructure of each of the detection units matches with and the filtering parameters of the corresponding first and second filter substructures 1221 and 1222. For example, the light source 121 may include a first light source substructure, a second light source substructure and a third light source substructure, and the colors of the second light 1211 emitted from the first, second and third light source substructures are red, green and blue.

It should be noted that, in the case where the filter structure is implemented as a liquid crystal filter structure (for example, a liquid crystal filter structure based on the F-P-cavity microcavity resonance), the structural parameters of the liquid crystal filter structures in the plurality of detection units may be, for example the same, thereby simplifying the fabrication process; in this case, although the liquid crystal filter structures in the plurality of detection units have identical parameters, different liquid crystal filter structures can have different filtering characteristics, this is because different driving voltage signals can be applied to different liquid crystal filter structures. For example, the first light 124 output from different liquid crystal filter structures may have different peak wavelengths.

For example, specific arrangements and technical effects of the first optical waveguide structure 113, the second optical waveguide structure 115, the sample detection area 111, the first light in-coupling structure 1134, the first light out-coupling structure 1135, the comparison detection area 112, the second light in-coupling structure 1151 and the second light out-coupling structure 1152, the first filter substructure 1221, the second filter substructure 1222, the light source 121, the first photosensitive area 132 and the second photosensitive area 133 may refer to the fluid detection panel 100 as illustrated in FIG. 3, and no further description will be given here.

The method of using the fluid detection panel 100 as illustrated in FIG. 14 will be exemplarily described below in conjunction with two examples.

For example, when there is only one liquid sample to be detected, the microfluidic substrate 110 is used to drive the liquid sample to be detected to the sample detection area 111 of one of the detection units (for example, the detection unit matching the liquid sample to be detected) of the fluid detection panel 100, and allow the second light 1211 emitted by the light source 121 to be incident onto the first filter substructure 1221 and the second filter substructure 222 of the detection unit; the first light 124 outputted by the first filter substructure 1221 and the second filter substructure 222 respectively enter the first and second optical waveguide structures 113 and 115, and the first light 124 entering the first optical waveguide structure 113 react with (for example, absorbing, scattering, wavelength converting, or escaping from the optical waveguide structure, or the like) the liquid sample to be detected; afterwards, light carrying the information of the liquid sample is incident onto the first photosensitive area 132 of the sensor 131, light leaving the second optical waveguide structure 115 is incident onto the second photosensitive area 133 of the sensor 131, and the first and second photosensitive areas 132 and 133 respectively provide a detection signal and a comparison signal, such that a calibrated detection signal can be acquired based on the detection signal and the comparison signal. For example, information of the above-mentioned liquid sample to be detected (for example, whether or not the liquid sample to be detected includes the first substance to be detected) may be determined by comparing the calibrated detection signal with pre-stored data (a pre-stored detection signal) of a standard sample, and the detection is completed after the information of the above-mentioned liquid sample to be detected being determined.

Figure 17:
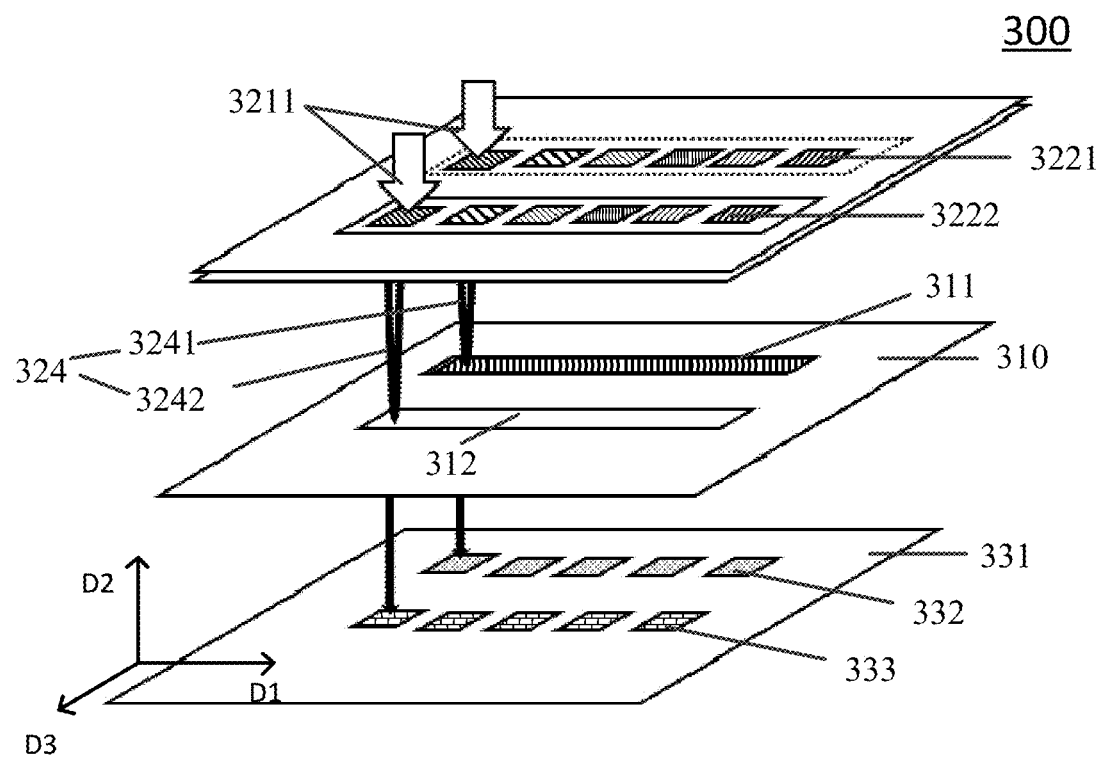
FIG. 17 is a schematic diagram of a still further fluid detection panel provided by some embodiments of the present disclosure.

For example, when a plurality of liquid samples to be detected are required to be detected, the microfluidic substrate 110 is used to respectively drive the plurality of liquid samples to be detected to the plurality of detection units (for example, the plurality of detection units respectively matched with the above-mentioned liquid sample to be detected) of the fluid detection panel 100, the second light 1211 emitted by the light source 121 is incident onto the first filter substructures 1221 and the second filter substructures 222; the first light 124 outputted by the first filter substructures 1221 and the second filter substructures 222 of the above-mentioned plurality of detection units react with (for example, absorbing, scattering, wavelength converting, or escaping from the optical waveguide structure, or the like) the liquid sample to be detected; afterwards, light carrying the information of the plurality of liquid samples is incident onto the first photosensitive areas 132 of the plurality of detection units, light leaving the second optical waveguide structures 115 of the plurality of detection units is incident onto the second photosensitive areas 133 of the plurality of detection units, and the first and second photosensitive areas 132 and 133 of the plurality of detection units respectively provide a plurality of detection signals and a plurality of comparison signal, such that a plurality of calibrated detection signals corresponding to the plurality of liquid samples to be detected can be acquired based on the plurality of detection signals and comparison signals. For example, the information of the above-mentioned plurality of liquid samples to be detected (for example, whether the first substance to be detected is included) may be determined by comparing the plurality of calibrated detection signals with pre-stored data (detection signal) of a standard sample, and the detection is completed after the information of the above-mentioned liquid sample to be detected being determined. It should be noted that the fluid detection panel 100 as illustrated in FIG. 17 can also simultaneous detect a plurality of liquid samples to be detected, and no further description will be given here.

Figure 15:
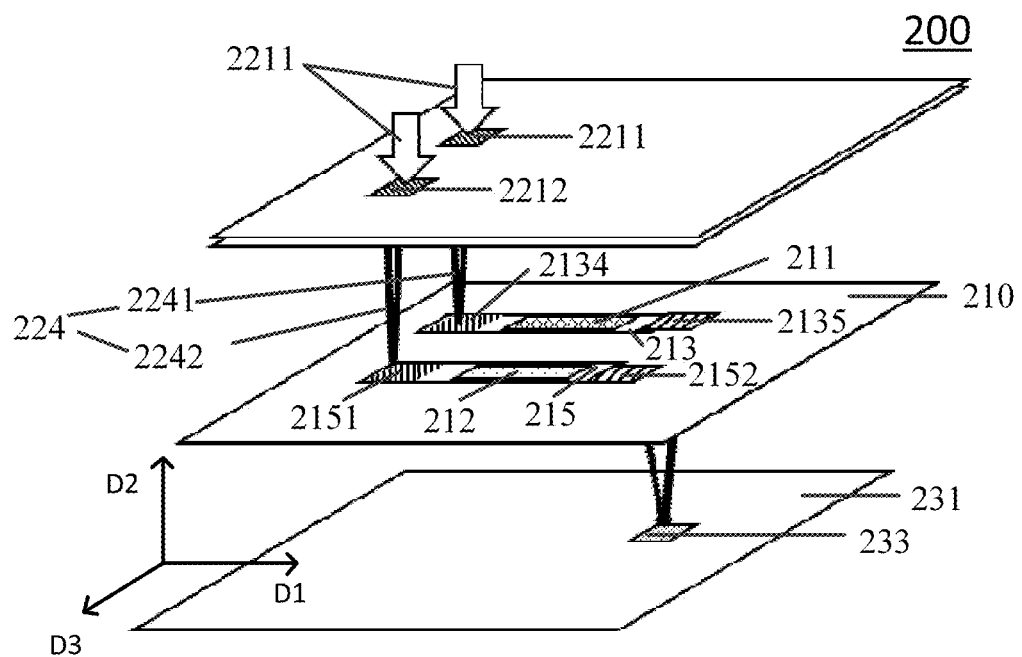
FIG. 15 is a schematic diagram of a still further fluid detection panel provided by some embodiments of the present disclosure.

FIG. 15 is a schematic diagram of a still further fluid detection panel 200 provided by some embodiments of the present disclosure. As illustrated in FIG. 15, the fluid detection panel 200 includes a microfluidic substrate 210, an optical unit and a sensor unit 231. As illustrated in FIG. 15, the sensor 231 includes a comparison photosensitive area 233, and the microfluidic substrate 210 includes a first optical waveguide structure 213, a second optical waveguide structure 215 and a flow passage in the first optical waveguide structure 213 (not shown).

As illustrated in FIG. 15, the first optical waveguide structure 213 is configured to allow the first light 224 (the first light beam 2241) to propagate in the first optical waveguide structure 213 based on total reflection; the first optical waveguide structure 213 includes a sample detection area 211, a first light in-coupling structure 2134 and a first light out-coupling structure 2135. The sample detection area 211 is an area, that is intersected with the propagation passage of the first optical waveguide structure 213, of the flow passage; the first light in-coupling structure 2134 is configured to couple the first light 224 that is incident on the first light in-coupling structure 2134 into the first optical waveguide structure 213; the first light out-coupling structure 2135 is configured to allow the first light 224 propagated in the first optical waveguide structure 213 to be coupled out and incident on the sensor 231 (the comparison photosensitive area 233 of the sensor 231).

As illustrated in FIG. 15, the second optical waveguide structure 215 is configured to allow the first light 224 (the second light beam 2242) to propagate in the second optical waveguide structure 215 based on total reflection; the second optical waveguide structure 215 includes a comparison detection area 212, a second light in-coupling structure 2151 and a second light out-coupling structure 2152. The second light in-coupling structure 2151 is configured to couple the first light 224 (second light beam 2242) that is incident on the second light in-coupling structure 2151 into the second optical waveguide structure 215; the second light out-coupling structure 2152 is configured to allow the first light 224 (second light beam 2242) propagated in the second optical waveguide structure 215 to be coupled out and incident on the sensor 231 (the comparison photosensitive area 233 of the sensor 231). For example, the first and second light out-coupling structures 2135 and 2152 have different structural parameters, such that the first light beam 2241 outputted by the first light out-coupling structure 2151 and the second light beam 2242 outputted by the second light out-coupling structure 2152 can be superimposed (overlapped) with each other (in the comparison photosensitive area 233).

As illustrated in FIG. 15, the optical unit includes a light source (not shown) and a filter structure, and the filter structure is configured to filter the second light 2211 emitted by the light source to obtain the first light 224, and to allow the first light 224 to be incident on the sample detection area 211 and the comparison detection area 212. The filter structure includes a first filter substructure 2211 and a second filter substructure 2212 which have the same filtering parameters. The first and second filter substructures 2211 and 2212 are configured to filter the second light 2211 so as to obtain discrete first light beam 2241 and second light beam 2242 from the first light 224, in which the first light beam 2241 and second light beam 2242 are respectively obtained by the first and second filter substructures 2211, the first light beam 2241 and the second light beam 2242 are spaced apart from each other, and the first and second light beams 2241 and 2242 are respectively guided to the sample detection area 211 and the comparison detection area 212.

As illustrated in FIG. 15, the light leaving the sample detection area 211 and the light passing through the comparison detection area 212 may be superimposed on the comparison photosensitive area 233; the comparison photosensitive area 233 of the sensor 231 is configured to detect the intensity distribution of the superimposed light, and then the information of the liquid sample may be obtained based on the information of intensity distribution provided by the sensor 231.

Figure 16:
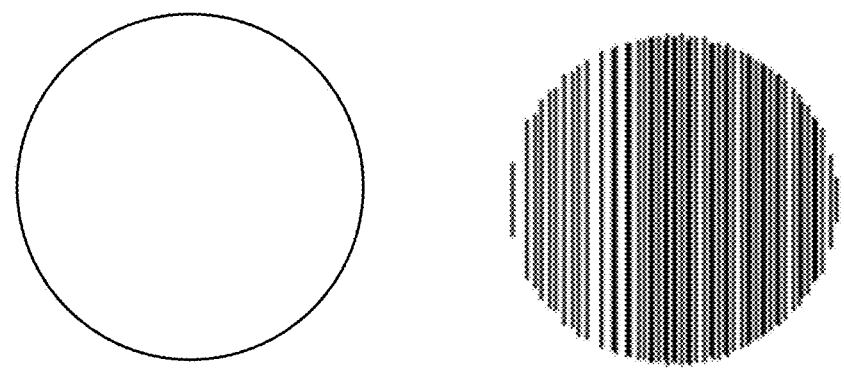
FIG. 16 is a diagram illustrating two intensity distributions outputted by a sensor of the still further fluid detection panel as illustrated in FIG. 15.

FIG. 16 is a diagram illustrating two intensity distributions outputted by the sensor 231 of the still further fluid detection panel 200 as illustrated in FIG. 15. For the sake of clarity, the meanings of the two intensity distributions as illustrated in FIG. 16 will be explained after describing the detection principle of the fluid detection panel 200 as illustrated in FIG. 15.

For example, specific implementations and technical effects of the fluid detection panel 200, the first optical waveguide structure 213, the second optical waveguide structure 215, the light source, the first filter substructure 2211, the second filter substructure 2212 and the sensor 231 which are illustrated in FIG. 15 may refer to the fluid detection panel 100 as illustrated in FIG. 3, and no further description will be given here.

The detection principle of the fluid detection panel 200 as illustrated in FIG. 15 is exemplarily described below. The second light (for example, collimated light) 2211 emitted by the light source is incident onto the first and second filter substructures 2211 and 2212, and the second light 2211 that is incident onto the first filter substructures 2211 and the second light 2211 that is incident onto the second filter substructures 2212 have the same parameters. The first and second filter substructures 2211 and 2212 are configured to respectively output discrete first and second light beams 2241 and 2242 with a full width at half maximum (FWHM) less than the FWHM of the second light 2211 by filtering. Because the first and second filter substructures 2211 and 2212 have the same filtering parameters, the first and second light beams 2241 and 2242 have the same parameters. The first light beam 2241 of the first light 224 leaving the first filter substructure 2211 is incident on the first light in-coupling structure 2134, and enters into the first optical waveguide structure 213 under the action of the first light in-coupling structure 2134 and propagates in the first optical waveguide structure 213 based on total reflection; and then, the first light beam 2241 reacts with the liquid sample in the flow passage. For example, the liquid sample can change the intensity information of the first beam 2241 (for example, the liquid sample absorbs at least part of the first light beam 2241 when the liquid sample is a predetermined liquid sample (a designated liquid sample); and/or the liquid sample can change the spectral information of the first light beam 2241. For example, when the liquid sample is the predetermined liquid sample, the liquid sample enables the peak wavelength of the first light beam 2241 to be converted from the first wavelength into the second wavelength, and the first wavelength is not the same as the second wavelength. Thus, the liquid sample enables the first light beam 2241 passing through the sample detection area 211 to carry the information of the liquid sample; and then, the first light beam 2241 carrying the information of liquid sample leaves the first optical waveguide structure 213 via the first light out-coupling structure 2135, and propagates towards the comparison photosensitive area 233. The second light beam 2242 leaving the second filter substructure 2212 is incident on the second light in-coupling structure 2151, enters the second optical waveguide structure 215 under the action of the second light in-coupling structure 2151, and propagates in the second optical waveguide structure 215 based on total reflection; and then, the second light beam 2242 leaves the second optical waveguide structure 215 via the second light out-coupling structure 2152 and propagates towards the comparison photosensitive region 233. The light outputted by the first optical waveguide structure 213 and the light outputted by the second optical waveguide structure 215 (that is, the light leaving the sample detection area 211 and the light passing through the comparison detection area 212) may be superimposed in the comparison photosensitive area 233 of the sensor 231, such that the comparison photosensitive area 233 is configured to detect the intensity distribution of the superimposed light, and then the information of the liquid sample may be obtained based on the signal that is related to the intensity distribution of the light and output by the sensor 231.

For example, because the second light beam 2242 does not react with the liquid sample, the intensity information and/or spectral information of the second light beam 2242 that is incident on the comparison photosensitive area 233 does not substantially change. For example, the peak wavelength of the second light beam 2242 is kept being the first wavelength.

For example, when the liquid sample is not the predetermined liquid sample, the liquid sample does not substantially change the intensity information and/or spectral information of the first light beam 2241 (e.g., the liquid sample does not change the peak wavelength of the first light beam 2241 from the first wavelength into the second wavelength). In this case, the light outputted from the first optical waveguide structure 213 and the light outputted from the second optical waveguide structure 215 satisfy the interference condition (the conditions that are required to be satisfied for realizing optical interference, that is, for example, the wavelengths are equal, the phase difference is constant, and the vibration direction is uniform), and thus, interference pattern may present in the comparison photosensitive area 233 of the sensor 231, such that the intensity distribution, that is detected by the comparison photosensitive area 233, of the superimposed light is a pattern with bright fringes and dark fringes that are alternately arranged (for example, referring to the second intensity distribution as illustrated in the right sub-figure of FIG. 16).

For example, when the liquid sample is the predetermined liquid sample, the liquid sample changes the intensity information and/or spectral information of the first light beam 2241 (e.g., the liquid sample changes the peak wavelength of the first light beam 2241 from the first wavelength to the second wavelength). In this case, the light outputted from the first optical waveguide structure 213 and the light outputted from the second optical waveguide structure 215 no longer satisfy the interference condition (for example, the spectral information of the first light beam 2241 is changed, such that the light outputted from the first optical waveguide structure 213 and the light outputted from the second optical waveguide structure 215 do not satisfy the condition of the same frequency required by interference), or the interference between the light outputted from the first optical waveguide structure 213 and the light outputted from the second optical waveguide structure 215 is very weak (for example, significant change in the intensity of the first light beam 2241 causes the interference between the light outputted from the first optical waveguide structure 213 and the light outputted from the second optical waveguide structure 215 to be very weak), and the interference pattern does not present in the comparison photosensitive area 233 of the sensor 231 or the interference is not very weak. Therefore, the intensity distribution, that is detected by the comparison photosensitive area 233, of the superimposed light is relatively uniform, for example, without a pattern with bright fringes and dark fringes that are alternately arranged, referring to the first intensity distribution as illustrated in the left sub-figure of FIG. 16. For example, the photosensitive signals output by different photosensitive pixels of the sensor 231 can be the same.

In some embodiments of the present disclosure, the light passing through (leaving) the sample detection area 211 refers to the light that reacts with the liquid sample in the sample detection area 211, and the light passing through the comparison detection region 212 refers to the light which passes through the comparison detection area 212 and does not react with the liquid sample. For example, the process that light reacts with the liquid sample refers to the process that light passes through the liquid sample or the process that the transmission condition of light are changed by the liquid sample (for example, such that at least part of light cannot propagates based on total reflection). It should be noted that, for the case where the light reacts with the liquid sample, the liquid sample substantially changes the intensity information and/or spectral information of the light (for example, when the liquid sample is the predetermined liquid sample, the liquid sample enables the peak wavelength of the first light beam 2241 to be converted from the first wavelength to the second wavelength); or the liquid sample does not substantially change the intensity information and/or spectral information of the light (for example, when the liquid sample is not the predetermined liquid sample, the liquid sample does not convert the peak wavelength of the first light beam 2241 from the first wavelength into the second wavelength).

For example, in the fluid detection panel 200 as illustrated in FIG. 15, the information of the liquid sample can be acquired directly through the information of intensity distribution output from the sensor 231 by superimposing the light outputted from the first optical waveguide structure 213 and the light outputted from the second optical waveguide structure 215 (that is, the light passing through the sample detection area and the light pass the comparison detection area 212) in the comparison photosensitive area 233 of the sensor 231. In this case, the information of the liquid sample (for example, whether the liquid sample to be detected contains predetermined molecules or bacteria) may be obtained without comparing the signal output by the sensor 231 with pre-stored data of a standard sample (for example, pre-stored in a database). Therefore, the detection efficiency of the fluid detection panel 200 can be improved, the detection cost of the fluid detection panel 200 can be lowered. It should be noted that, according to actual application requirements, the intensity distribution signal output by the sensor 231 may also be provided to a signal processing device for performing benchmarking and analysis, and no further description will be given here.

It should be noted that, in order to improve the detection capability and detection efficiency of the fluid detection panel 200 as illustrated in FIG. 15 (e.g., to detect a plurality of samples simultaneously), the fluid detection panel 200 as illustrated in FIG. 15 may be provided with a plurality of first filter substructures 2211, a plurality of second filter substructures 2212, a plurality of first optical waveguide structures 213, a plurality of second optical waveguide structures 215, and a plurality of comparison photosensitive areas 233, and no further description will be given here.

FIG. 17 is a schematic diagram of a still further fluid detection panel 300 provided by some embodiments of the present disclosure. The fluid detection panel 300 illustrated in FIG. 17 can detect a plurality of liquid samples simultaneously, thereby improving the detection capability and detection efficiency of the fluid detection panel 300.

As illustrated in FIG. 17, the fluid detection panel 300 includes a microfluidic substrate 310, an optical unit, and a sensor 331. For example, the optical unit, the microfluidic substrate 310 and the sensor 331 are sequentially arranged in the second direction D2. The microfluidic substrate 310 includes a sample detection area 311 and a comparison detection region 312 arranged in parallel.

As illustrated in FIG. 17, the optical unit includes a light source (not shown) and a filter structure which is configured to filter the second light 3211 emitted by the light source to obtain the first light 324, and to enable the first light 324 to be incident on the sample detection area 311 and the comparison detection area 312. The filter structure includes a first filter substructure 3221 and a second filter substructure 3222 which have the same structural parameters and filtering parameters. The first and second filter substructures 3221 and 3222 respectively filter the second light 3211 to obtain discrete first and second light beams 3241 and 3242 from the first light 324, in which the first and second light beams 3241 and 3242 are spaced apart from each other, and respectively guided to the sample detection area 311 and the comparison detection area 312. As illustrated in FIG. 17, the optical unit includes a plurality of filter structures arranged in parallel in the first direction D1, and the plurality of filter structures may have the same or different filtering characteristics. For example, specific implementations and technical effects of the fluid detection panel 300, the light source, the first filter substructure 3221 and the second filter substructure 3222, which are illustrated in FIG. 17, may refer to the fluid detection panel 100 as illustrated in FIG. 3, and no further description will be given here.

Figure 18:
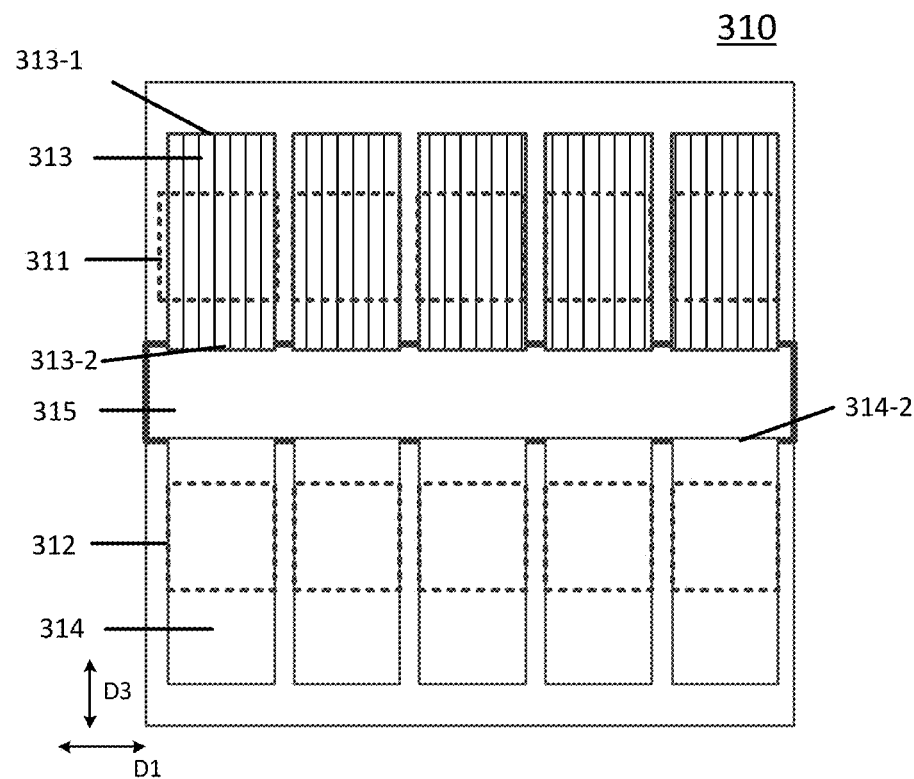
FIG. 18 is a schematic plan view of the microfluidic substrate of the fluid detection panel as illustrated in FIG. 17.

FIG. 18 is a schematic plan view of the microfluidic substrate 310 of the fluid detection panel 300 as illustrated in FIG. 17. As illustrated in FIG. 18, the microfluidic substrate 310 includes a liquid tank 315, and a detection region and a comparison region which are provided on two sides of liquid tank 315 in the third direction D3. The detection region includes a plurality of flow passages 313 (for example, a microflow passage) arranged in parallel in the first direction D1, the flow passages 313 may be separated by, for example, spacers, or the like, and assist the liquid to flow; the comparison region includes a plurality of second flow passages 314 arranged in parallel in the first direction D1. The area, which is corresponding to the first filter substructure 3221, of the flow passage 313 is the sample detection area 311, and the area, which is corresponding to the second filter substructure 3222, of the second flow passage 314 is the comparison detection area 312.

A terminal end 313-2 of the flow passage 313 and a terminal end 314-2 of the second flow passage 314 are respectively connected with the liquid tank 315, such that the detected liquid sample can flow into the liquid tank 315 to be temporarily stored. The flow passage 313 and the second flow passage 314 are respectively extend in the third direction D3, and the third direction D3 is intersected with (for example, perpendicular to) the first direction D1 and the second direction D2. During operation, the liquid sample enters the flow passage 313 from a start terminal 313-1 of the flow passage 313, then flows into the sample detection area 311 (such that the liquid sample can be detected) and finally flows in the liquid tank 315 through the terminal end 313-2 of the flow passage 313. For example, the microfluidic substrate 310 includes a plurality of driving electrodes (not shown) which are arranged to drive the liquid sample to the detection area, such that the liquid sample can be detected, for example, the plurality of driving electrodes allows the liquid sample to flow through the sample detection area 311.

For example, according to actual application requirements, the microfluidic substrate 310 may not be provided with the second flow passage 314. In this case, the comparison detection area 312 is an area of the microfluidic substrate 310 corresponding to the second filter substructure 3222.

It should be noted that, for the sake of clarity, the microfluidic substrate 310 illustrated in FIG. 17 illustrates only the sample detection area 311 and the comparison detection region 312 and does not illustrates the flow passage 313. For example, those skilled in the art can understand that the microfluidic substrate 310 illustrated in FIG. 17 includes a plurality of sample detection areas 311 arranged in parallel in the first direction D1 and a plurality of comparison detection areas arranged in parallel in the first direction D1. For example, the manner of the plurality of sample detection areas 311 and the plurality of comparison detection areas 312 in the microfluidic substrate 310 is similar to the arrangement illustrated in FIG. 20, and no further description will be given here.

As illustrated in FIG. 17, the sensor 331 includes a plurality of first photosensitive areas 332 and a plurality of second photosensitive areas 333. The plurality of first photosensitive areas 332 and the plurality of second photosensitive areas 333 are provided, for example, on the sensor substrate. For example, as illustrated in FIG. 17, the plurality of first photosensitive areas 332 are arranged in parallel in the first direction D1, the plurality of second photosensitive areas 333 are arranged in parallel in the first direction D1, and each of the first photosensitive areas 332 and a corresponding second photosensitive areas 333 are arranged in parallel in the third direction D3.

For the sake of clarity, the following description is made with respect to one of the plurality of first photosensitive areas 332 and one second photosensitive area 333 corresponding to the one of the plurality of first photosensitive areas 332, the other of the plurality of first photosensitive areas 332 and other second photosensitive areas 333 of the plurality of second photosensitive areas 333 can be provided in a similar manner, and no further description will be given here.

As illustrated in FIGS. 17 and 18, the sample detection area 311 and the first photosensitive area 332 of the sensor 331 are at least partially superimposed with each other in a direction perpendicular to the microfluidic substrate 310, so as to allow the first light 324 that is incident onto the sample detection area 311 to pass through the sample detection area 311 and then to be incident onto the first photosensitive area 332 of the sensor 331; the first photosensitive area 332 is configured to output a detection signal through detecting the light passing through the sample detection area 311.

As illustrated in FIGS. 17 and 18, the comparison detection area 312 and the second photosensitive area 333 of the sensor 331 are at least partially superimposed with each other in a direction perpendicular to the microfluidic substrate 310, so as to allow the first light 324 that is incident onto the comparison detection area 312 to pass through the comparison detection area 312 and then to be incident onto the second photosensitive area 333 of the sensor 331. The second photosensitive area 333 is configured to output a comparison signal through detecting the light passing through the comparison detection area 312. For example, the detection signal and the comparison signal are used to acquire a calibrated detection signal.

As illustrated in FIG. 17, the first and second photosensitive areas 332 and 333 are spaced apart, and the spacing (the spacing in the third direction D3) between the first and second photosensitive areas 332 and 333 is matched with the spacing (the spacing in the third direction D3) between the sample detection area 311 and the comparison detection area 312. For example, when setting the spacing between the first and second photosensitive areas 332 and 333, the control accuracy of the propagation direction of the light leaving the sample detection area 311 and the control accuracy of the propagation direction of the light leaving the comparison detection area 312 are taken into account, and no further description regarding specific setting of the spacing between the first and second photosensitive areas 332 and 333 will be given here. For example, specific implementations and technical effects of the fluid detection panel 300, the first photosensitive area 332 and the second photosensitive area 333 illustrated in FIG. 17 may refer to the fluid detection panel 300 illustrated in FIG. 3 and no further description will be given here.

It should be noted that, for the fluid detection panel provided by the embodiments as illustrated in FIGS. 1 to 3, 14, 15 and 17, the second light emitted by the light source is perpendicularly incident onto the filter structure, and the light is incident perpendicularly onto the sensor, but the embodiments of the present disclosure are not limited thereto. For example, the second light emitted by the light source can also be obliquely incident onto the filter structure, and the light can also be obliquely incident on the sensor, and details are not described here.

Figure 19:
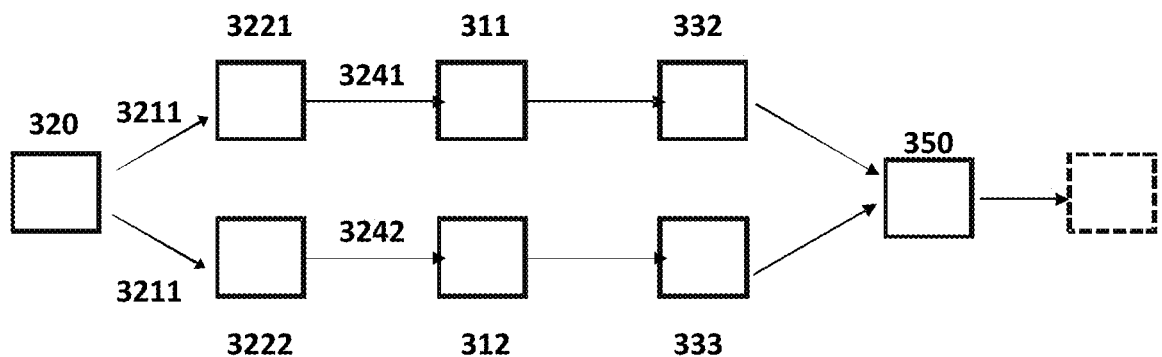
FIG. 19 is a diagram illustrating a working process of the fluid detection panel as illustrated in FIG. 17.

FIG. 19 is a diagram illustrating a working process of the fluid detection panel as illustrated in FIG. 17. The method of detecting whether or not the liquid sample, that is detected by the fluid detection panel 300 as illustrated in FIG. 17, contains predetermined bacteria or substance will be exemplarily explained below in conjunction with FIG. 19.

First, the second light 3211 emitted by the light source is incident onto the first and second filter substructures 3221 and 3222 of the filter structure (the second light 3211 that is incident onto the first filter substructure 3221 and the second light 3211 that is incident onto the second filter substructure 3222 are the same). Next, the first and second filter substructures 3221 and 3222 respectively obtain the first and second light beams 3241 and 3242 through filtering the second light 3211 emitted by the light source, and, and then the first and second light beams 3241 and 3242 are respectively guided to the sample detection area 311 and the comparison detection area 312. Third, the first light beam 3241 reacts with the liquid sample in the sample detection area 311 and then passes through the sample detection area 311, and the second light beam 3242 passes through the comparison detection area 312 without reaction with the liquid sample. Fourth, the light passing through the sample detection area 311 is incident onto the first photosensitive area 332 of the sensor 331, and the first photosensitive area 332 provides a detection signal; the light passing through the comparison detection area 312 is incident onto the second photosensitive area 333 of the sensor 331, and the second photosensitive area 333 provides a comparison signal. Fifth, the signal processing device receives the detection signal and the comparison signal output from the sensor 331, and thus obtains a calibrated detection signal; afterwards, the calibrated detection signal is compared with the data (for example, pre-stored in a database of the server) of the pre-stored standard sample (made of predetermined bacteria or predetermined substances) to obtain the information of the liquid sample (for example, whether the liquid sample to be detected contains predetermined molecules or bacteria), such that the signal processing device can output the analysis result (for example, to determine that the liquid sample contains certain bacteria or substance), and thus the subsequent operations can be performed (referring to a dotted box in FIG. 19).

For example, when the liquid sample contains the predetermined bacteria or substance, the information regarding the absorption peak of the liquid sample in the calibrated detection signal matches the information of the absorption peak of the pre-stored standard sample, such that it is determined that the liquid sample to be detected contains predetermined molecules or bacteria. For example, when no predetermined bacteria or substance is present in the liquid sample, the information regarding the absorption peak of the liquid sample in the calibrated detection signal does not match the information of the absorption peak of the pre-stored standard sample, such that it is determined that the liquid sample to be detected does not contain predetermined molecules or bacteria.

For example, when comparing the calibrated signal with the data in the database, if the bacteria or substance present in the liquid sample are not recorded in the database (i.e., unknown bacteria or unknown substances present in the liquid sample), the plurality of detection units of the plurality of fluid detection panels 300 (the first light 324 reacting with the liquid samples in different detection units have different wavelengths) can be adopted to detect the unknown bacteria or the unknown substances, and then the information of the unknown bacteria or the unknown substances can be determined in combination with the detection results of the plurality of detection units. For example, each of the detection units includes a first filter substructure 3221, a second filter substructure 3222, a sample detection area 311, a comparison detection area 312, a first photosensitive area 332, and a second photosensitive area 333. For example, the plurality of sample detection areas 311 of the plurality of detection units can be connected with each other, such that the fluid driving substrate can drive the liquid sample to sequentially pass through the plurality of sample detection areas 311 of the plurality of detection units.

Figure 20:
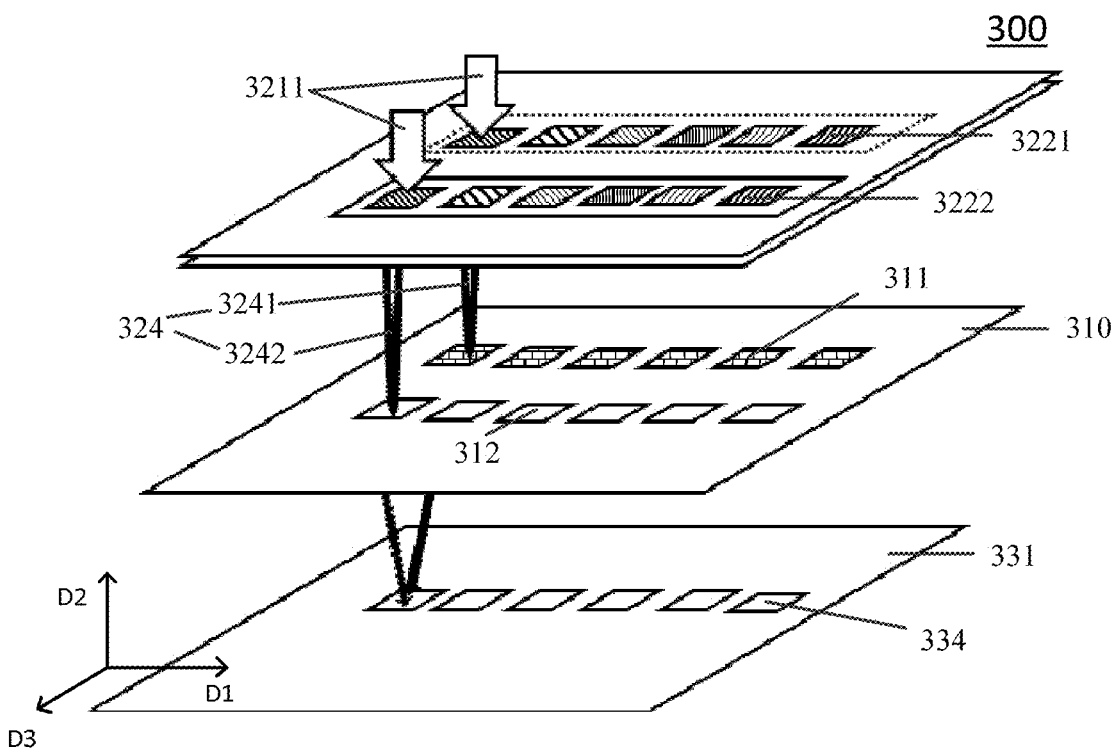
FIG. 20 is a schematic view of a still further fluid detection panel provided by some embodiments of the present disclosure.

FIG. 20 is a schematic view of a still further fluid detection panel 300 provided by some embodiments of the present disclosure. The fluid detection panel 300 illustrated in FIG. 20 can simultaneously detect a plurality of liquid samples, thereby improving the detection capability and detection efficiency of the fluid detection panel 300. The fluid detection panel 300 illustrated in FIG. 20 is similar to the fluid detection panel 300 illustrated in FIG. 17, and therefore, only the differences will be described herein, without repeating the similarities.

The fluid detection panel 300 illustrated in FIG. 20 differs from the fluid detection panel 300 illustrated in FIG. 20 in that the sensor 331 of the fluid detection panel 300 illustrated in FIG. 20 includes a comparison photosensitive area 334, instead of including the first and second photosensitive areas 332 and 333, and the light outputted by the first filter substructure 3221 and the light outputted by the second filter substructure 3222 are both propagated towards the corresponding comparison photosensitive area 334, such that the light outputted by the first filter substructure 3221 and the light outputted by the second filter substructure 3222 can be superimposed on the comparison photosensitive area 334, and the information of intensity distribution can be obtained by the comparison photosensitive area of the sensor 331, and then the information of the liquid sample can be directly obtained based on the information of the intensity distribution output by the sensor 331; in this case, the information of the liquid sample (for example, whether the liquid sample to be detected contains predetermined molecules or bacteria) can be obtained without comparing the signal output by the sensor 331 with the pre-stored data of the standard sample (for example, pre-stored in the database), thereby improving the detection efficiency of the fluid detection panel 300 and lowering the detection cost of the fluid detection panel 300. For example, the first filter substructure 3221 can enable the light outputted by the first filter substructure 3221 to be obliquely incident onto the sample detection area 311, such that the light leaving the sample detection area 311 can propagate from the sample detection area 311 towards the comparison photosensitive area 334; the second filter substructure 3222 can enable the light outputted by the second filter substructure 3222 to be obliquely incident onto the comparison detection area 312, such that the light leaving the comparison detection area 312 can propagate from the comparison detection area 312 towards the comparison photosensitive area 334.

For example, the fluid detection panels provided by some embodiments of the present disclosure can substantially realize detection of any substance to be detected or any bacteria, and the fluid detection panel has an advantage of having a high resolution. For example, because both of the comparison detection area and the second photosensitive area are provided in the fluid detection panel, and the first light beam (for example, detection light) that is incident on the sample detection area and the second light beam (for example, reference light) that is incident on the comparison detection area have the same parameters, the detection signal acquired by the first photosensitive area can be calibrated using the comparison signal acquired by the second photosensitive area, such that the calibrated detection signal is obtained. Because the influence of the fluctuations (for example, spectral fluctuations and/or intensity fluctuations) of the light source and the change in the light propagation path on the detection signal are eliminated through the calibration, the fluid detection panel provided by some embodiments of the present disclosure has high detection accuracy, low error and strong resistance to the fluctuations of the light source and the light propagation path.

For example, based on actual application requirements, the fluid detection panels according to various embodiments described above can be reused, that is, can be configured for detecting different liquid samples a plurality of times. For example, the fluid detection panel can be cleaned after each time the detection of the sample by the fluid detection panel is finished, thereby realizing reutilization of the fluid detection panel.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. A fluid detection panel, comprising: a microfluidic substrate, an optical unit and a sensor,
   wherein the microfluidic substrate comprises a sample detection area and a comparison detection area which are arranged in parallel, and the sample detection area is configured to allow a liquid sample to arrive at the sample detection area;
   the optical unit is configured to provide first light and to allow the first light to be incident on both of the sample detection area and the comparison detection area; and
   the sensor collects the first light which passes through the sample detection area and the first light which passes through the comparison detection area.

2. The fluid detection panel according to claim 1, wherein the microfluidic substrate further comprises a first optical waveguide structure;
   the sample detection area is in the first optical waveguide structure; and
   the first optical waveguide structure is configured to allow the first light that is coupled into the first optical waveguide structure to propagate in the first optical waveguide structure based on total reflection, so as to allow the first light that is coupled into the first optical waveguide structure to be incident on the sample detection area.

3. The fluid detection panel according to claim 2, wherein the first optical waveguide structure comprises a core layer, a first cladding layer and a second cladding layer; and
   a refractive index of the core layer is greater than refractive indices of the first and second cladding layers.

4. The fluid detection panel according to claim 3, wherein the microfluidic substrate further comprises a flow passage in the core layer;
   an extension direction of the flow passage intersects with an extension direction of a propagation passage of the first optical waveguide structure for the first light in the first optical waveguide structure; and
   the sample detection area is an area, which intersects with the propagation passage, of the flow passage.

5. The fluid detection panel according to claim 3, wherein the microfluidic substrate further comprises a flow passage that is in the first cladding and exposes the core layer;
   an extension direction of the flow passage intersects with an extension direction of a propagation passage of the first optical waveguide structure for the first light in the first optical waveguide structure; and the sample detection area is an area, which intersects with the propagation passage, of the flow passage.

6. The fluid detection panel according to claim 2, wherein the first optical waveguide structure comprises a first light in-coupling structure and a first light out-coupling structure;

the first light in-coupling structure is configured to couple the first light that is incident on the first light in-coupling structure into the first optical waveguide structure; and the first light out-coupling structure is configured to allow the first light propagated in the first optical waveguide structure to be coupled out and be incident on the sensor.

7. The fluid detection panel according to claim 6, wherein the microfluidic substrate further comprises a second optical waveguide structure;

the comparison detection area is in the second optical waveguide structure;

the second optical waveguide structure includes a second light in-coupling structure and a second light out-coupling structure;

the second light in-coupling structure is configured to couple the first light that is incident on the second light in-coupling structure into the second optical waveguide structure;

the second optical waveguide structure is configured to allow the first light that is coupled into the second optical waveguide structure to propagate in the second optical waveguide structure based on the total reflection, so as to allow the first light that is coupled into the second optical waveguide structure to be incident on the comparison detection area; and the second light out-coupling structure is configured to allow the first light propagated in the second optical waveguide structure to be coupled out and be incident on the sensor.

8. The fluid detection panel according to claim 7, wherein at least one of the first light in-coupling structure, the first light out-coupling structure, the second light in-coupling structure and the second light out-coupling structure comprises a grating.

9. The fluid detection panel according to claim 1, wherein the optical unit comprises a filter structure; and the filter structure is configured to obtain the first light through filtering a second light emitted by a light source, and is further configured to allow the first light to be incident on both of the sample detection area and the comparison detection area.

10. The fluid detection panel according to claim 9, wherein the optical unit further comprises the light source;

the light source is located on a side of the filter structure away from the microfluidic substrate; and the light source at least partially overlaps the filter structure.

11. The fluid detection panel according to claim 10, wherein the optical unit further comprises a first substrate;

the first substrate comprises a light transmitting region and a light shielding region; and the filter structure is in the light transmitting region of the first substrate.

12. The fluid detection panel according to claim 11, wherein the filter structure comprises a first filter substructure and a second filter substructure;

a filtering parameter of the first filter substructure and a filtering parameter of the second filter substructure are same;

the second light emitted by the light source is incident on both of the first filter substructure and the second filter substructure;

the first and second filter substructures are configured to obtain the first light through filtering the second light, and the first light comprises discrete first and second light beams; and the first and second light beams are respectively guided to the sample detection area and the comparison detection area.

13. The fluid detection panel according to claim 10, wherein an orthographic projection of the sample detection area on the sensor is spaced apart from an orthographic projection of the filter structure on the sensor.

14. The fluid detection panel according to claim 13, wherein the sensor comprises a photosensitive area;

the orthographic projection of the sample detection area on the sensor is between the orthographic projection of the filter structure on the sensor and the photosensitive area.

15. The fluid detection panel according to claim 1, wherein the sensor comprises first and second photosensitive areas which are spaced apart;

the first photosensitive area is configured to output a detection signal through detecting the first light which passes through the sample detection area;

the second photosensitive area is configured to output a comparison signal through detecting the first light which passes through the comparison detection area; and the detection signal and the comparison signal are used to acquire a calibrated detection signal.

16. The fluid detection panel according to claim 1, wherein the sensor comprises a comparison photosensitive area;

the first light which passes through the sample detection area is capable of overlapping the first light which passes through the comparison detection area on the comparison photosensitive area; and the comparison photosensitive area is configured to detect an intensity distribution of light obtained through overlapping the first light which passes through the sample detection area and the first light which passes through the comparison detection area.

17. The fluid detection panel according to claim 1, wherein the sample detection area at least partially overlaps the sensor in a direction perpendicular to the microfluidic substrate, so as to allow the first light that is incident on the sample detection area to pass through the sample detection area and then be incident onto the sensor; and the comparison detection area at least partially overlaps the sensor in the direction perpendicular to the microfluidic substrate, so as to allow the first light that is incident on the comparison detection area to pass through the comparison detection area and then be incident onto the sensor.

18. The fluid detection panel according to according to claim 17, wherein the sensor includes first and second photosensitive areas which are spaced apart;

the first photosensitive area is configured to output a detection signal through detecting the first light which passes through the sample detection area;

the second photosensitive area is configured to output a comparison signal through detecting the first light which passes through the comparison detection area; and the detection signal and the comparison signal are used to acquire a calibrated detection signal.

19. The fluid detection panel according to claim 17, wherein the sensor comprises a comparison photosensitive area;

the first light which passes through the sample detection area is capable of overlapping the first light which passes through the comparison detection area on the comparison photosensitive area; and the comparison photosensitive area is configured to detect an intensity distribution of light obtained through overlapping the first light which passes through the sample detection area and the first light which passes through the comparison detection area.

20. The fluid detection panel according to claim 1, wherein the microfluidic substrate further comprises a plurality of driving electrodes;

the plurality of driving electrodes are configured to receive a driving voltage to drive the liquid sample to arrive at the sample detection area; and the filter structure comprises a Fabry-Perot-cavity microcavity resonant type filter structure, a transmissive waveguide grating, and a transmissive holographic grating.

* * * * *